(12) United States Patent
Furuich et al.

(10) Patent No.: US 8,593,018 B2
(45) Date of Patent: Nov. 26, 2013

(54) VIBRATION GENERATOR

(75) Inventors: Keisuke Furuich, Ueda (JP); Masahiko Miyazaki, Ueda (JP); Tomohiro Akanuma, Ueda (JP); Takahiro Takagi, Ueda (JP)

(73) Assignee: Nidec Seimitsu Corporation, Ueda-shi, Nagano (JP)

( * ) Notice: Subject to any disclaimer, the term of this patent is extended or adjusted under 35 U.S.C. 154(b) by 380 days.

(21) Appl. No.: 13/027,604

(22) Filed: Feb. 15, 2011

(65) Prior Publication Data
US 2011/0198949 A1 Aug. 18, 2011

(30) Foreign Application Priority Data

Feb. 16, 2010 (JP) ................................. 2010-031208
Jan. 15, 2011 (JP) ................................. 2011-006513

(51) Int. Cl.
*H02K 33/00* (2006.01)
*H02K 33/16* (2006.01)
*B06B 1/04* (2006.01)

(52) U.S. Cl.
USPC ............................................. 310/29; 310/17

(58) Field of Classification Search
USPC .................. 310/15, 17, 20, 21, 25, 36–39
See application file for complete search history.

(56) References Cited

U.S. PATENT DOCUMENTS

| | | | |
|---|---|---|---|
| 5,682,132 A * | 10/1997 | Hiroyoshi et al. | 340/407.1 |
| 6,404,085 B2 * | 6/2002 | Hamaguchi et al. | 310/81 |
| 6,487,300 B1 * | 11/2002 | Lee et al. | 381/396 |
| 6,867,511 B2 * | 3/2005 | Fukunaga et al. | 310/12.24 |
| 7,170,205 B2 * | 1/2007 | Won et al. | 310/36 |

FOREIGN PATENT DOCUMENTS

| | | | | |
|---|---|---|---|---|
| JP | 2003-154314 A1 | 5/2003 | | |
| JP | 2006-007161 | * 1/2006 | ............... | B06B 1/04 |
| JP | 2006-296127 A | * 10/2006 | ............. | H02K 33/16 |

OTHER PUBLICATIONS

Machine Translation, Wakuta, JP 2006-296127, Oct. 2006.*

* cited by examiner

*Primary Examiner* — Burton Mullins
(74) *Attorney, Agent, or Firm* — Westerman, Hattori, Daniels & Adrian, LLP

(57) ABSTRACT

A vibration generator making a closed loop of a magnetic circuit of a permanent magnet to obtain a high vibrating force while kept small in size, including a reciprocating vibrator having a ring-shaped permanent magnet in a center hole of a ring-shaped weight, a first and second plate springs supporting this reciprocating vibrator at a recessed case and end plate to be able to elastically displace in a thickness direction spanning a first and a second end faces, a tubular toroidal coil passing through a center hole of the permanent magnet and generating a reciprocating vibrating magnetic field for reciprocatingly driving the permanent magnet in the thickness direction, and a columnar core passing through this toroidal coil, the ring-shaped permanent magnet being magnetized in the thickness direction, and the toroidal coil having a lower toroidal coil and an adjoining reversely wound series connected upper toroidal coil coaxial with the same.

19 Claims, 17 Drawing Sheets

FIG. 4
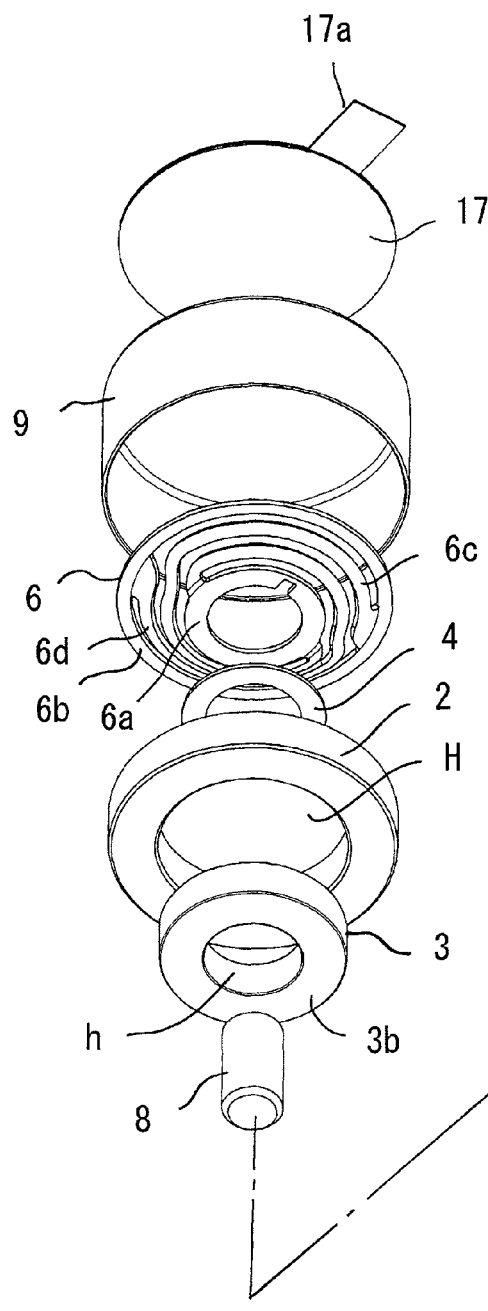
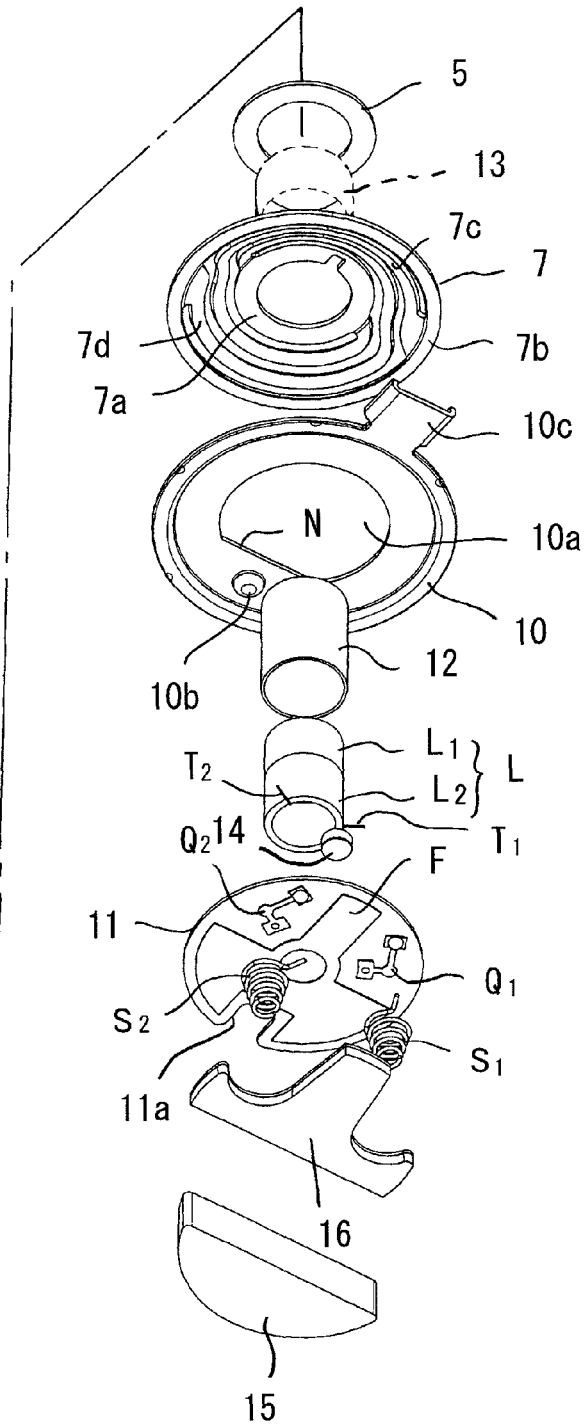

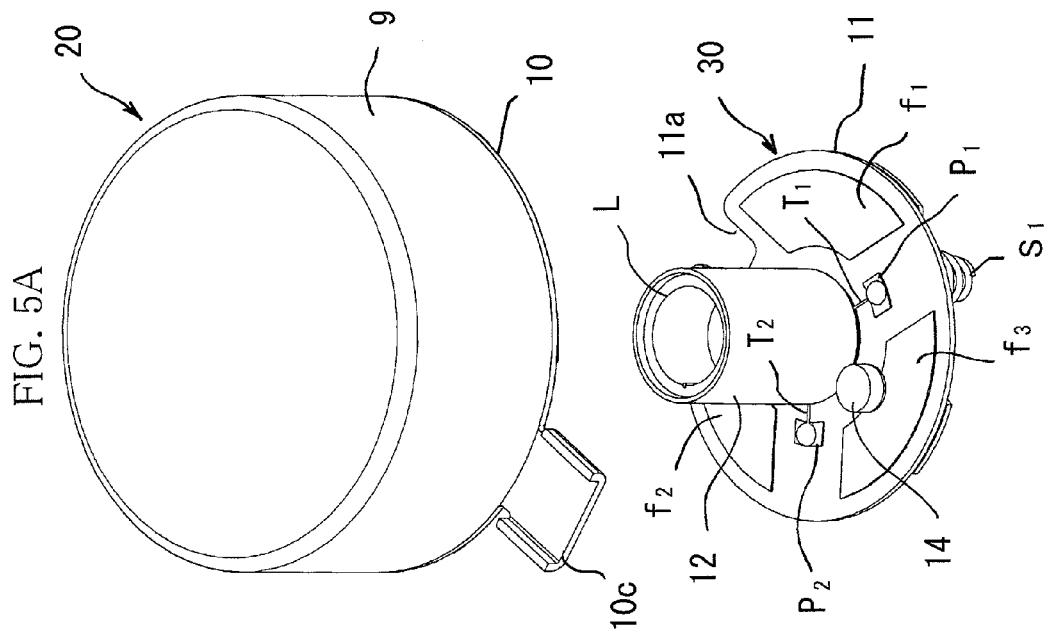
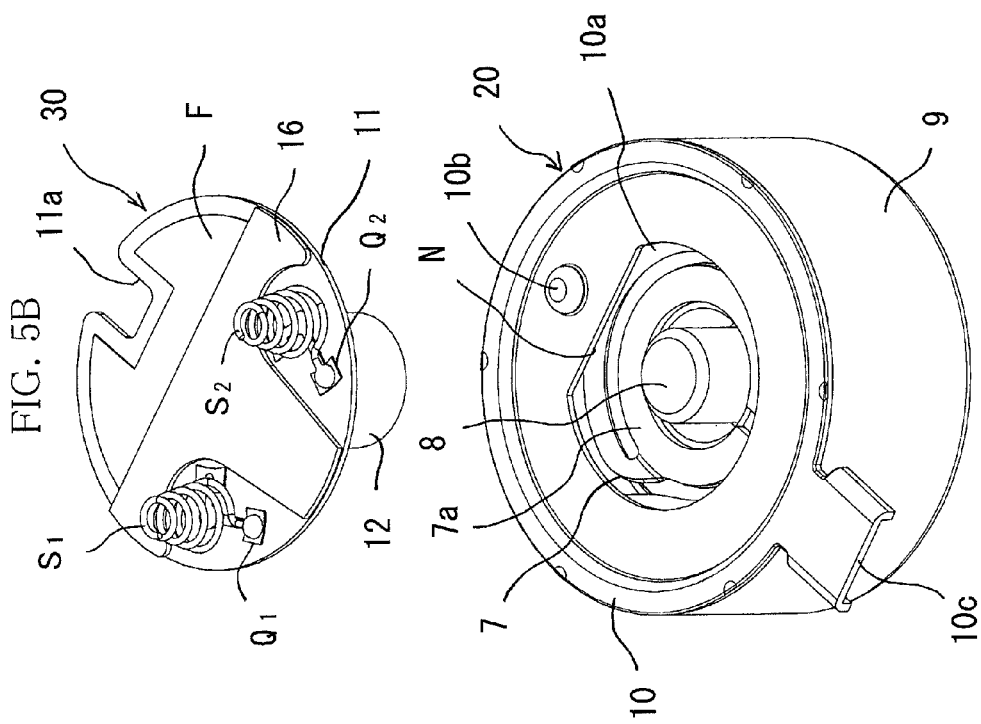

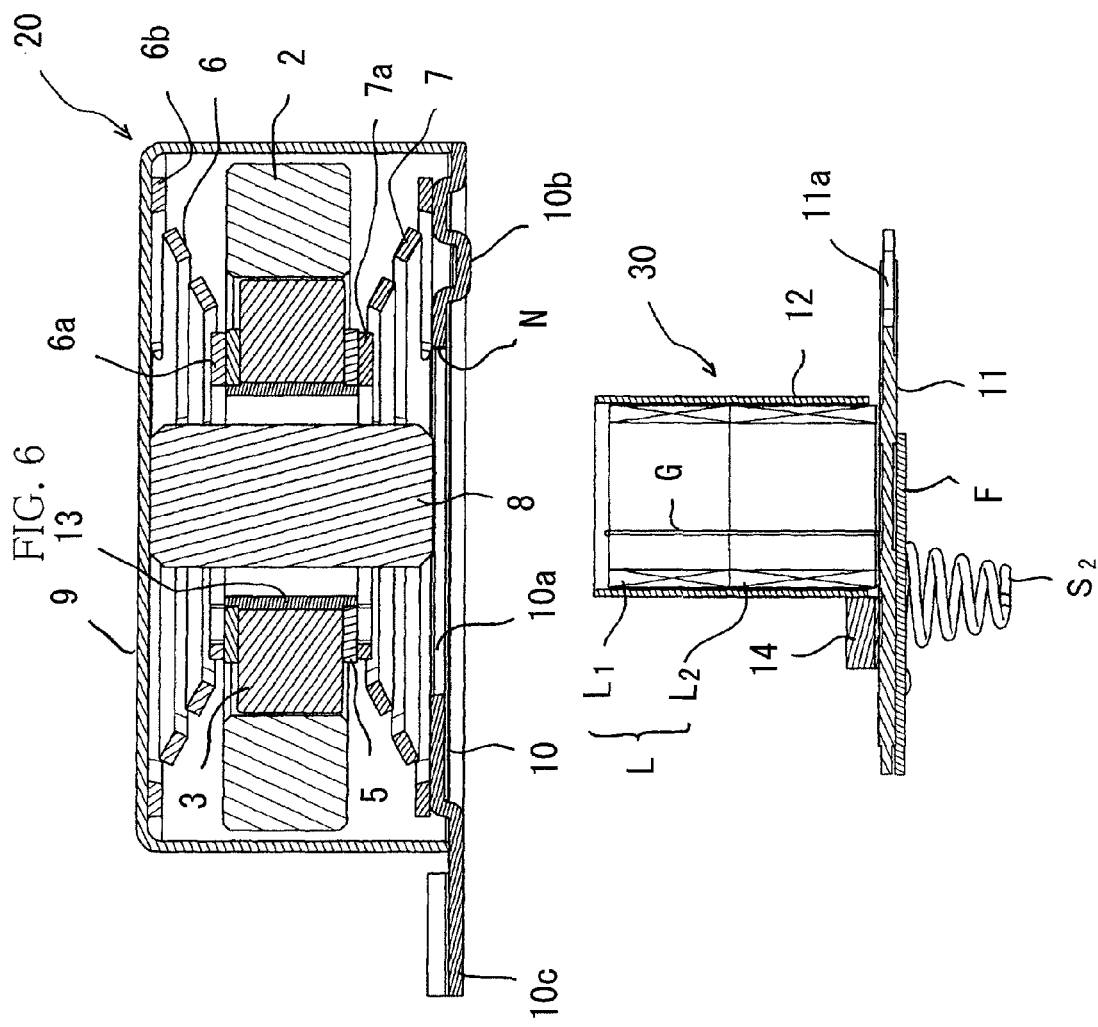

Prior Art

VIBRATION GENERATOR

CROSS-REFERENCE TO RELATED APPLICATION

This application is based upon and claims the benefit of priority of the prior Japanese Patent Application No. 2010, 031208, filed on Feb. 16, 2010, and the prior Japanese Patent Application No. 2011, 006513, filed on Jan. 15, 2011, the entire contents of which are incorporated herein by reference.

BACKGROUND OF THE INVENTION

1. Field of the Invention

The present invention relates to a vibration generator which is built into a mobile phone etc., more particularly relates to the structure of a vibration generator by which a high vibrating force is obtained.

2. Description of the Related Art

As shown in FIG. 17, the vibration linear actuator 51 disclosed in Japanese Patent Publication (A) No. 2003-154314 is provided with a ring-shaped external yoke 54 as a weight having a cylindrical permanent magnet 55 at its inner circumference side, a first plate spring 57 fastened to a first end face 54a of this external yoke 54 by elastically deforming an outer circumference side hanging part 57a, a second plate spring 56 the same as this first plate spring 57 and fastened to a second end face 54b of this external yoke 54 by elastically deforming an outer circumference side hanging part 56a, and a stator supporting the first and second plate springs 57 and 56 and having a coil 52 which generates a reciprocating vibration magnetic field at an inner circumference side of the permanent magnet 55, wherein this stator is provided with a plastic base 59 at a bottom surface of which a power feed land 61 is arranged and from which a shaft 58 stands and, with an internal yoke 53 on this base 59 having the shaft 58 at its center and forming also a coil bobbin of the coil 52. An inner circumference side 57b of the first plate spring 57 mates with a first projection 53a of the internal yoke 53, while an inner circumference side 56b of the second plate spring 56 mates with a second projection 53b of the internal yoke 53 and is sandwiched between the base 59 and internal yoke 53.

In the state with no power fed to the coil 52, the external yoke 54 serving as the weight remains at a standstill at an illustrated neutral position in the axial direction where the elastic recovery force outward at the first end face 54a side due to the first plate spring 57 and the elastic recovery force outward at the second end face 54b side due to the second plate spring 56 are balanced, but due to the alternating current flowing through the coil 52, an S-pole and an N-pole are alternately generated at the two ends of the internal yoke 53 in the axial direction, so the ring-shaped permanent magnet 55 magnetized in the radial direction, solely receives a magnetic attraction/repulsion action in the axial direction due to the strong magnetic pole at the inner circumferential surface side close to the internal yoke 53 rather than the magnetic pole at the outer circumferential surface side, so the first plate spring 57 and the second plate spring 56 alternately are restored to the free state of their planar shapes in a repeated operation and the external yoke 54 engages in reciprocating linear motion in the thrust direction resulting in reciprocating vibration.

As related art, there is Japanese Patent Publication A No. 2003-154314 (FIG. 1).

However, in the above vibration linear actuator 51, due to the alternating current flowing through the coil 52, the two ends of the internal yoke 53 across the axial direction alternately switch between the S-pole and the N-pole, but the outer circumferential surface of the external yoke 54 has the opposite magnetic pole to the magnetic pole of the inner circumferential surface of the permanent magnet 55. The magnetic pole of the outer circumferential surface of the external yoke 54 has the effect of suppressing linear reciprocating vibration of the permanent magnet 55, so it is necessary to lengthen the diametrical direction distance from the inner circumferential surface of the permanent magnet 55 to the outer circumferential surface of the external yoke 54 so as to weaken that effect. The longer the outer diameter of the external yoke 54 is set, the more this runs counter to the reduction of size of the vibration linear actuator of course, the magnetic circuit of the permanent magnet 55 becomes an open loop, and the vibration force becomes weaker. Obtaining the required vibration force leads to a larger size due to the increased number of turns of the coil 52 or an increase in the power consumption due to the increase in the alternating current.

SUMMARY OF THE INVENTION

Therefore, in view of the above problem, an object of the present invention is to provide a vibration generator which forms the magnetic circuit of the permanent magnetic carried in a mechanical vibrator into a closed loop so as to keep the size small while obtaining a high vibrating force.

The vibration generator according to the present invention has a mechanical vibrator having a first ring-shaped permanent magnet with a front and back comprised of an N pole face and an S pole face, a fastening part supporting the mechanical vibrator in a plate thickness direction spanning the N pole face and the S pole face through a suspension spring means, a magnetic core member supported by the fastening part and passing through a center hole of the first ring-shaped permanent magnet, and a first toroidal coil fitting over an outer circumferential surface of the magnetic core member and facing an inner circumferential surface of the center hole, wherein the mechanical vibrator is provided with a first ring-shaped pole piece superposed over at least one magnetic pole face among the N pole face and the S pole face, the first ring-shaped pole piece having an inner circumferential edge approaching an outer circumferential surface of the first toroidal coil.

In this structure, the magnetization direction of the first ring-shaped permanent magnet is the axial direction parallel to the magnetic core member, the magnetic force lines from the N pole face to the S pole face form a short circuit closed loop of a low magnetic resistance including a first concentrated flux path crossing across the current flowing through the first toroidal coil between the inner circumferential edge of the first ring-shaped pole piece and the outer circumferential surface of the magnetic core member to generate an electromagnetic force, an air gap flux path with the outer circumferential surface of the magnetic core member at the magnetic pole face without a ring-shaped pole piece, and a low magnetic resistance path in the magnetic core member, so at the first concentrated flux path, the electromagnetic force which is applied to the ring-shaped permanent magnet along with the alternation of current which is fed to the first toroidal coil switches between forward and reverse in the axial direction, so compared with the conventional case of drive by magnetic attraction/repulsion, drive is possible with a high vibrating force. Further, among the N pole face and S pole face, the magnetic force lines at the outer circumference side part of the first ring-shaped permanent magnet are short circuited at the thickness direction of the ring-shaped permanent magnet, so there is no adverse effect on the first concentrated flux path or the air gap flux path, therefore a reduction in the size of the device can be realized.

Preferably, the mechanical vibrator is provided with a second ring-shaped pole piece superposed over one of the pole faces of the first ring-shaped permanent magnet, the magnetic polarity of the one of the pole faces is opposite to the magnetic polarity of the first ring-shaped pole piece, and the second ring-shaped pole piece has an inner circumferential edge approaching the outer circumferential surface of the magnetic core member. In this case, due to the provision of the second ring-shaped pole piece, the path between the other magnetic pole face and the outer circumferential surface of the magnetic core member also forms a second concentrated flux path, so it is possible to further lower the magnetic resistance. This leads to strengthening of the vibrating force.

Further, preferably the vibration generator has a second toroidal coil adjoining the first toroidal coil, fitting over the outer circumferential surface of the magnetic core member, and facing the inner circumferential surface of the center hole, the inner circumferential edge of the second ring-shaped pole piece approaching an outer circumferential surface of said second toroidal coil. Depending on the direction of feed of current to the second toroidal coil, at the second concentrated flux path as well, it is possible to generate an electromagnetic force of the same direction as the electromagnetic force in the first concentrated flux path. This contributes to magnification of the vibrating force and reduction of size of the device.

The first toroidal coil and second toroidal coil may be connected in parallel, but to decrease the number of feed terminals, the first toroidal coil and second toroidal coil are preferably connected in series by windings wound in reverse directions.

The fastening part has a recessed case and an end plate fastened to an open side of the recessed case, the first toroidal coil being stacked over the second toroidal coil in the same diameter, the second toroidal coil being mounted on a printed circuit board, and the end plate has a through hole of a size enabling passage of said first toroidal coil and said second toroidal coil. After obtaining the assembly of the recessed case and end plate, it is possible to simply inject a magnetic fluid for functioning as a damper of the mechanical vibrator via the through hole of the end plate so as to coat the inner circumferential surface of the ring-shaped permanent magnet. Not only this, after this, it is possible to insert the first and second toroidal coils from this through hole and fasten the printed circuit board to the back surface of the end plate and thereby possible to facilitate manufacture.

To prevent the generation of electrical noise from the vibration generator, it is necessary to ground and shield the outer housing having the recessed case and end plate. As the structure for feeding a ground potential to the end plate, preferably the end plate has a current carrying projection which contacts a conductive rubber piece, which is adhered to a back surface of the printed circuit board, through a notch formed in the printed circuit board. This is not a connection structure of the end plate and a pattern on the printed circuit board, but a direct connection structure of a current carrying projection of the end plate and a conductive rubber piece. Therefore, it is possible to obtain the current carrying projection at the time of press forming the end plate and possible to realize lower cost.

Preferably, the first ring-shaped pole piece overlaps the S pole face of the first ring-shaped permanent magnet, the second ring-shaped pole piece overlaps the N pole face of the first ring-shaped permanent magnet, and the magnetic core member has a center iron core member spanning in the inside of the first toroidal coil and the second toroidal coil, a first permanent magnet core member having an S pole face overlapped on one end face of the center iron core member in the first toroidal coil, and a second permanent magnet core member having an N pole face overlapped on another end face of the center iron core member in the second toroidal coil. In this configuration, the magnetic force lines running from the second ring-shaped pole piece through the second toroidal coil to the magnetic core member, even with alternation of the current fed to the toroidal coil, run from the magnetization direction of the second permanent magnet core member through the magnetization direction of the center iron core member over the magnetization direction of the first permanent magnet core member to pass through the first toroidal coil and flow into the first ring-shaped pole piece, so it is possible to further decrease the magnetic resistance in the magnetic core member. This contributes to strengthening of the vibrating force and reduction of size of the device.

On the other hand, it is also possible to employ a configuration where the first ring-shaped pole piece overlaps the S pole face of the first ring-shaped permanent magnet, the second ring-shaped pole piece overlaps the N pole face of the first ring-shaped permanent magnet, and the magnetic core member has a center iron core member which spanning in the inside of the first toroidal coil and the second toroidal coil, the center iron core member having a magnetization direction of a reverse direction to the magnetization direction of the first ring-shaped permanent magnet, a first iron core member overlapping the N pole face of the center permanent magnet core member in the first toroidal coil, and a second iron core member overlapping the S pole face of the center permanent magnet core member in the second toroidal coil. In this configuration as well, the magnetic force lines running from the second ring-shaped pole piece through the second toroidal coil to the magnetic core member, even with alternation of the current fed to the toroidal coil, run from the magnetization direction of the second permanent magnet core member through the magnetization direction of the center iron core member over the magnetization direction of the first permanent magnet core member to pass through the first toroidal coil and flow into the first ring-shaped pole piece, so it is possible to further decrease the magnetic resistance in the magnetic core member. This contributes to strengthening of the vibrating force and reduction of size of the device.

As another configuration of the mechanical vibrator, in addition to the first ring-shaped permanent magnet and first ring-shaped pole piece, the mechanical vibrator has a second ring-shaped permanent magnet including an N pole end face and an S pole end face, and the magnetic pole faces of the same poles of the first ring-shaped permanent magnet and the second ring-shaped permanent magnet sandwich the first ring-shaped pole piece. In this configuration, the flux density at the first concentrated flux path is substantially doubled, so this contributes to the strengthening of the vibrating force.

Further, preferably the mechanical vibrator is provided with a second ring-shaped pole piece and a third ring-shaped pole piece superposed over one of the pole faces of the first ring-shaped permanent magnet and the second ring-shaped permanent magnet, the magnetic polarity of the one of the pole faces being opposite to the magnetic polarity of the first ring-shaped pole piece, the second ring-shaped pole piece and the third ring-shaped pole piece having inner circumferential edges approaching the outer circumferential surface of the magnetic core member. The path between the inner circumferential edge of the second ring-shaped pole piece and the outer circumferential surface of the magnetic core member forms a second concentrated flux path, while the path between the inner circumferential edge of the third ring-shaped pole piece and the outer circumferential surface of the magnetic core member forms a third concentrated flux path, so it is possible to further lower the magnetic resistance. This leads to an increase of the vibrating force.

When the mechanical vibrator has three toroidal coils, preferably the vibration generator has second and third toroidal coils adjoining the first toroidal coil, the first toroidal coil being provided between the second and third toroidal coils, fitting over the outer circumferential surface of the magnetic core member, and facing the inner circumferential surface of the center hole, the inner circumferential edges of the second and third ring-shaped pole pieces approaching corresponding outer circumferential surfaces of the second and third toroidal coils. Depending on the direction of feed of current to the second and third toroidal coils, it is also possible, in the second and third concentrated flux paths as well, to cause the generation of an electromagnetic force of the same direction as the electromagnetic force in the first concentrated flux path, so it is possible to realize a stronger vibrating force.

The first toroidal coil, the second toroidal coil, and the third toroidal coil may also be connected in parallel, but to reduce the number of the feed terminals, the first toroidal coil and the second toroidal coil are preferably connected with each other in series by windings wound in reverse directions, while the first toroidal coil and the third toroidal coil are preferably connected with each other in series by windings wound in reverse directions.

Further, preferably the first ring-shaped pole piece overlaps the N pole face of the first ring-shaped permanent magnet, the second ring-shaped pole piece overlaps the S pole face of the first ring-shaped permanent magnet, the third ring-shaped pole piece overlaps the S pole face of the second ring-shaped permanent magnet, and the magnetic core member has a center iron core member spanning in the inside of the first toroidal coil, the second toroidal coil and the third toroidal coil, a first permanent magnet core member having an S pole face overlapped on one end face of the center iron core member in the second toroidal coil, and a second permanent magnet core member having an S pole face overlapped on another end face of the center iron core member in the second toroidal coil.

In this configuration, the magnetic force lines running from the first ring-shaped pole piece through the first toroidal coil to the magnetic core member, even with alternation of the current fed to the toroidal coil, run from the center iron core member through the magnetization direction of the first permanent magnet core member through the second toroidal coil and flow into the second ring-shaped pole piece and also run from the center iron core member through the magnetization direction of the second permanent magnet core member through the third toroidal coil and flow into the third ring-shaped pole piece, so it is possible to further decrease the magnetic resistance in the magnetic core member. This contributes to strengthening of the vibrating force and reduction of size of the device.

Further, conversely, it is possible to employ a configuration wherein the first ring-shaped pole piece overlaps the S pole face of the first ring-shaped permanent magnet, the second ring-shaped pole piece overlaps the N pole face of the first ring-shaped permanent magnet, the third ring-shaped pole piece overlaps the N pole face of the second ring-shaped permanent magnet, and the magnetic core member has a center iron core member spanning in the inside of the first toroidal coil, the second toroidal coil and the third toroidal coil, a first permanent magnet core member having an N pole face overlapped on one end face of the center iron core member in the second toroidal coil, and a second permanent magnet core member having an N pole face overlapped on another end face of the center iron core member in the third toroidal coil.

On the other hand, it is also possible to employ configuration wherein the first ring-shaped pole piece overlaps the N pole face of the first ring-shaped permanent magnet, the second ring-shaped pole piece overlaps the S pole face of the first ring-shaped permanent magnet, the third ring-shaped pole piece overlaps the S pole face of the second ring-shaped permanent magnet, and the magnetic core member has a center iron core member accommodated in the inside of the first toroidal coil, a first permanent magnet core member having an S pole face overlapped on one end face of the center iron core member in the first toroidal coil and second toroidal coil, a second permanent magnet core member having an S pole face overlapped on another end face of the center iron core member in the first toroidal coil and the third toroidal coil, a first end iron core member overlapping an N pole face of the first permanent magnet core member in the second toroidal coil, and a second end iron core member overlapping an N pole face of second permanent magnet core member in the third toroidal coil.

In this configuration as well, the magnetic force lines running from the first ring-shaped pole piece through the first toroidal coil to the magnetic core member, even with alternation of the current fed to the toroidal coil, run from the center iron core member through the magnetization direction of the first permanent magnet core member and the magnetization direction of the first end iron core member through the second toroidal coil and flow into the second ring-shaped pole piece and also run from the center iron core member through the magnetization direction of the second permanent magnet core member and the magnetization direction of the second end iron core member through the third toroidal coil and flow into the third ring-shaped pole piece, so it is possible to further decrease the magnetic resistance in the magnetic core member. This contributes to strengthening of the vibrating force and reduction of size of the device.

Further, conversely, it is possible to employ a configuration where the first ring-shaped pole piece overlaps the S pole face of the first ring-shaped permanent magnet, the second ring-shaped pole piece overlaps the N pole face of the first ring-shaped permanent magnet, the third ring-shaped pole piece overlaps the N pole face of the second ring-shaped permanent magnet, and the magnetic core member has a center iron core member accommodated in the inside of the first toroidal coil, a first permanent magnet core member having an N pole face overlapped on one end face of the center iron core member in the first toroidal coil and second toroidal coil, a second permanent magnet core member having an N pole face overlapped on another end face of the center iron core member in the first toroidal coil and the third toroidal coil, a first end iron core member overlapping an S pole face of the first permanent magnet core member in the second toroidal coil, and a second end iron core member overlapping an S pole face of second permanent magnet core member in the third toroidal coil.

The outer circumferential surface of the toroidal coil is preferably covered by a protective tube. At the time of impact upon being dropped etc., the inner circumferential surface of the ring-shaped permanent magnet is prevented from striking the outer circumferential surface of the toroidal coil so the device can be protected from coil breakage.

Further, when the gap between the outer circumferential surface of the protective tube and the inner circumferential surface of the center hole of the ring-shaped permanent magnet is filled with a magnetic fluid, even if an outside impact force is given, the magnetic fluid acts as a buffer material, so it is possible to effectively suppress sudden collision of the ring-shaped permanent magnet with the protective tube.

Summarizing the advantageous effects of the present invention, in the present invention, the magnetization direction of the ring-shaped permanent magnet is the axial direction parallel to the magnetic core member, and, in the first concentrated flux path by the first ring-shaped pole piece, along with alternation of the feed of current to the first toroidal coil, the electromagnetic force which is applied to the ring-shaped permanent magnet switches to forward and reverse with respect to the axial direction, so compared with the conventional drive by magnetic attraction/repulsion, drive by a high vibrating force is possible. The magnetic force lines of the outer circumference side part of the ring-shaped permanent magnet are short circuited at the thickness direction of the ring-shaped permanent magnet, so it is possible to realize a reduced size of the vibration generator without a detrimental effect on the first concentrated flux path etc.

BRIEF DESCRIPTION OF THE DRAWINGS

These and other objects and features of the present invention will become clearer from the following description of the preferred embodiments given with reference to the attached drawings, wherein FIG. 1A is a perspective view showing the appearance of a vibration linear actuator according to a first embodiment of the present invention, while

FIG. 4 is an assembled perspective view of the vibration linear actuator seen from below;

FIG. 5A is a perspective view showing a combination of a case side structure and a lid side structure of the vibration linear actuator, while FIG. 5B is a perspective view showing a combination of the case side structure and the back lid side structure;

FIG. 6 is a longitudinal cross-sectional view showing a combination of the case side structure and the back lid side structure;

DESCRIPTION OF THE PREFERRED EMBODIMENTS

Figure 1A:
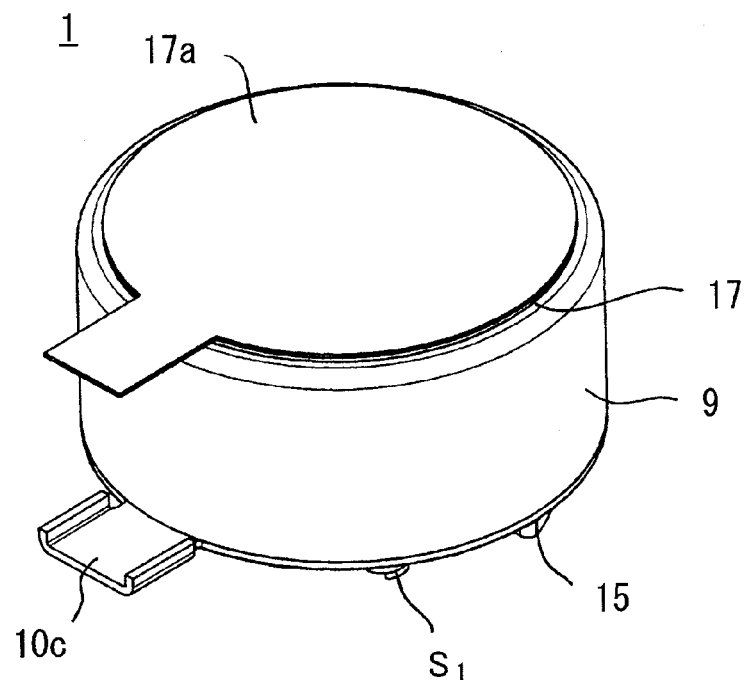
Figure 1B:
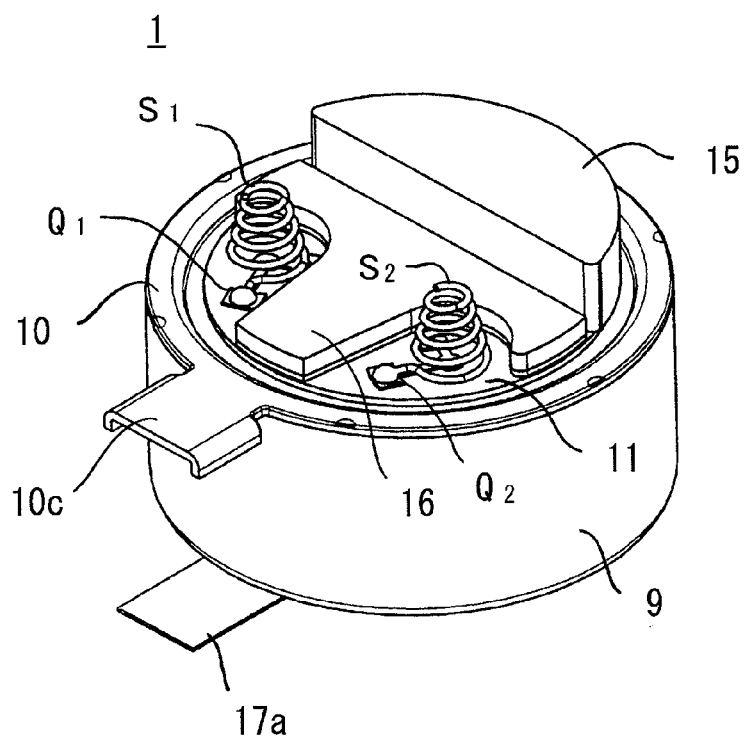
FIG. 1B is a perspective view showing an inverted state of the vibration linear actuator.
Figure 2:
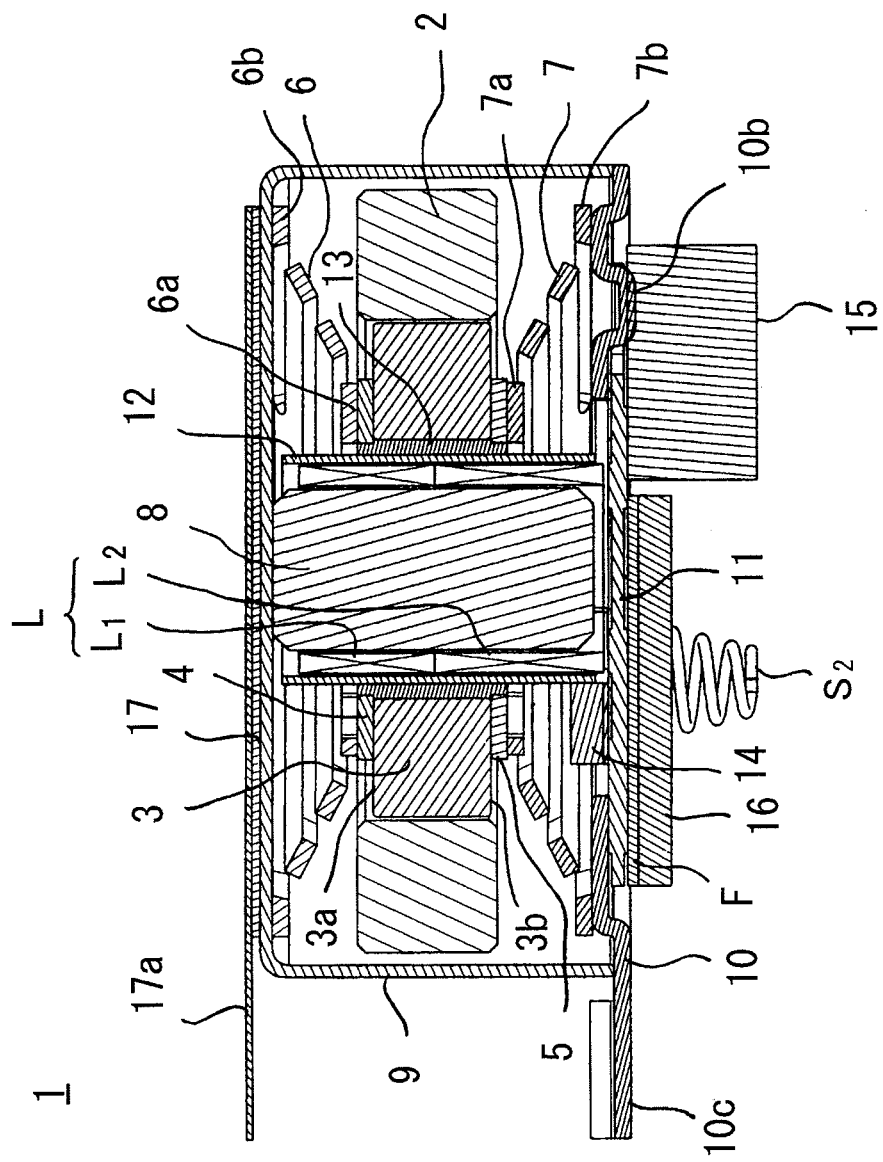
FIG. 2 is a longitudinal cross-sectional view of the vibration linear actuator.
Figure 3:
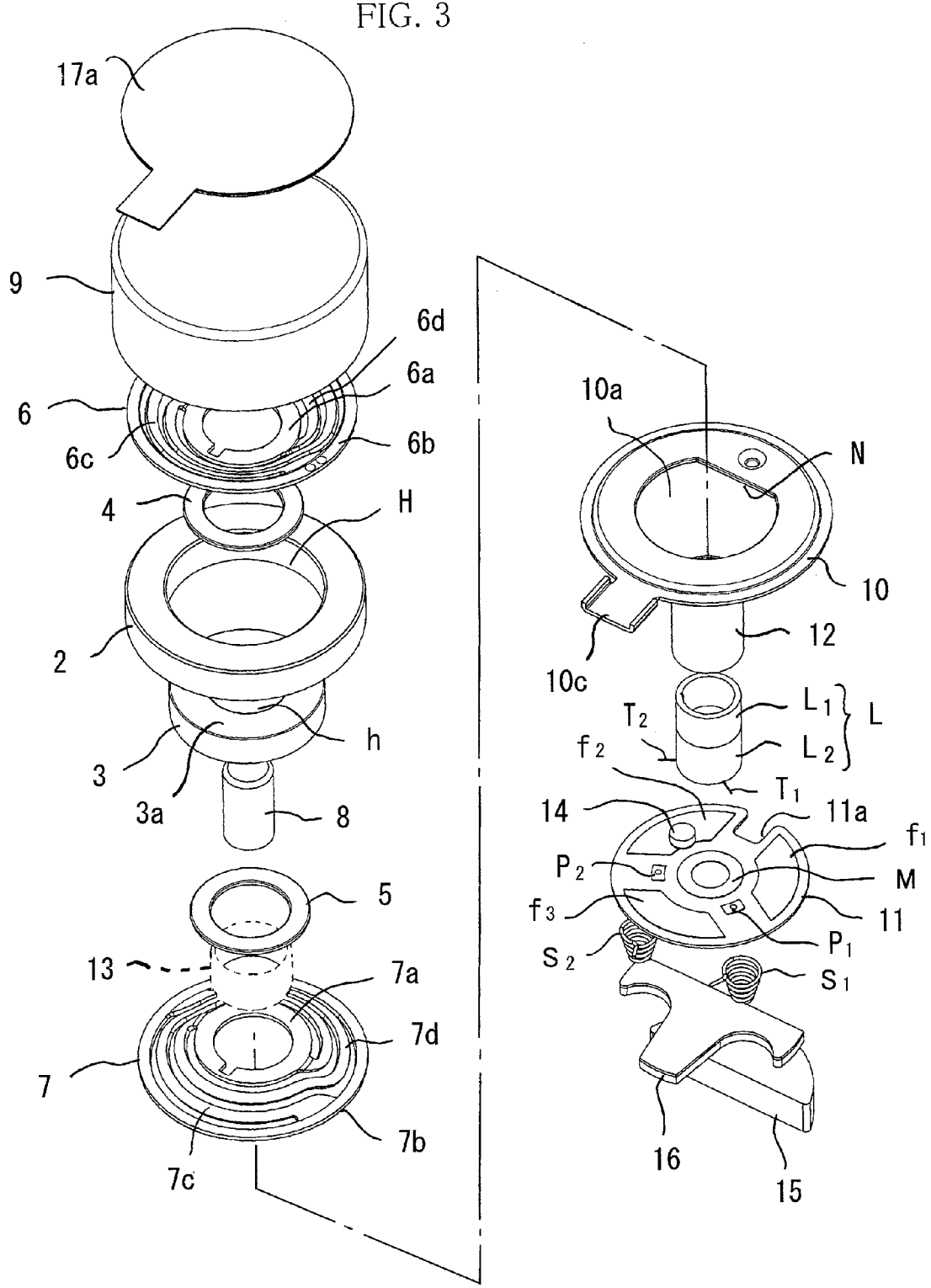
FIG. 3 is an assembled perspective view of the vibration linear actuator seen from above.
Figure 7A:
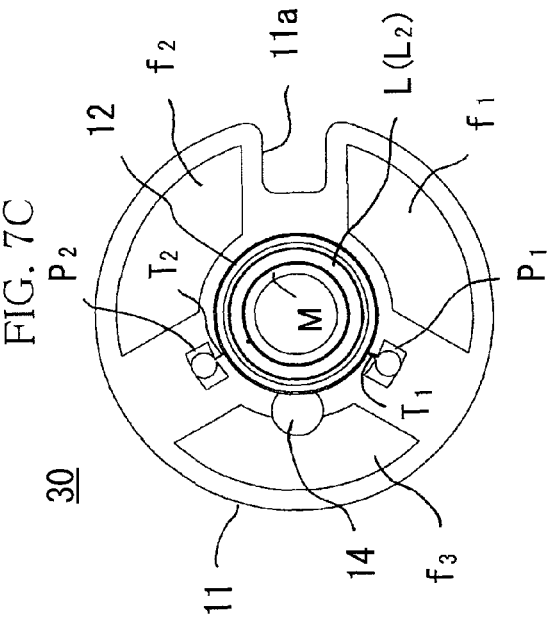
FIG. 7A is a front view of the back lid side structure.
Figure 7B:
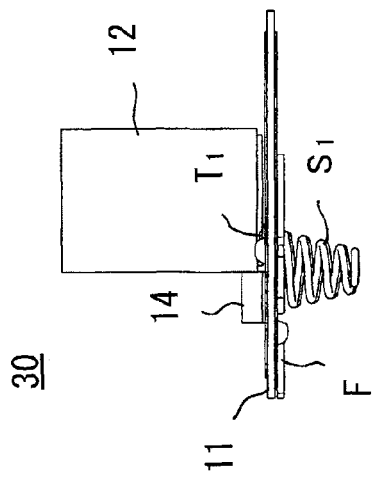
FIG. 7B is a bottom view of the back lid side structure.
Figure 7C:
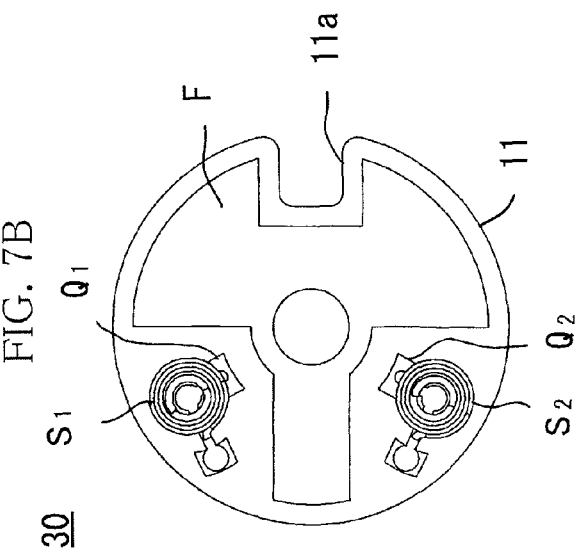
FIG. 7C is a plan view of the back lid side structure.

Next, embodiments of the present invention will be explained with reference to the attached drawings.

First Embodiment

The vibration linear actuator 1 of this embodiment is provided with a ring-shaped permanent magnet 3 which is fit in a center hole H of a ring-shaped weight 2 and which is magnetized by a single pole in a thickness direction between a top end face (S pole face) 3a and bottom end face (N pole face) 3b, a ring-shaped top pole piece 4 which is adhered to the top end face 3a by an adhesive, a ring-shaped bottom pole piece 5 which is adhered to the bottom end face 3b by an adhesive, a top plate spring 6 having an inner circumference side hanging part 6a fastened to the top pole piece plate 4 by for example spot welding, adhesion, or another means and having an outer circumference side hanging part 6b fastened to a bottom surface of a recessed case 9, a bottom plate spring 7 having an inner circumference side hanging part 7a fastened to the bottom pole piece plate 5 and having an outer circumference side hanging part 7b fastened to an end plate 10 fastened to an opening side of the recessed case 9, a columnar core (iron core) 8 which is a magnetic core member passing through a center hole h of the ring-shaped permanent magnet 3 and fastened standing up at the bottom surface of the recessed case 9, a cylindrically shaped toroidal coil L standing up on a printed circuit board 11 adhered to the back surface of the end plate 10 and fit from a through hole 10a of the end plate 10 over the columnar core 8, a plastic protective tubular member 12 standing up on the printed circuit board 11 and fit over the toroidal coil L, a magnetic fluid 13 filled in the space between the inner circumferential surface of the ring-shaped permanent magnet 3 and the outer circumferential surface of the protective tubular member 12 sandwiched between the top pole piece plate 4 and the bottom pole piece plate 5, a rubber damper 14 adhered on the printed circuit board 11 and buffering against sharp impact of an inner circumference side hanging part 7a of the bottom plate spring 7 on the printed circuit board 11, a pair of spiral spring terminals $S_1$, $S_2$ connected to the back surface of the printed circuit board 11, a soft crescent-shaped conductive rubber piece 15 bonded to the back surface of the printed circuit board 11 while straddling a notch 11a and contacting a conductive projection 10b of the end plate 10 through the notch 11a, and a hard, substantially T-shaped rubber sheet 6 bonded with the back surface of the printed circuit board 11 for being closely held in a holding space (not shown) of the vibration linear actuator 1 itself, and a double-sided tape 17 with a peeloff sheet 17a adhered to the recessed case 9.

The toroidal coil L includes a cylindrically shaped lower stage toroidal coil $L_2$ and a coaxial, superposed, cylindrically shaped, oppositely wound series upper stage toroidal coil $L_1$.

The second winding terminal $T_2$ bulging out from the end face of the lower stage toroidal coil $L_2$ is soldered to a second coil connection pattern $P_2$ on the printed circuit board 11, while the first winding terminal $T_1$ bulging out from the end face of the lower stage toroidal coil $L_2$ from the upper stage toroidal coil $L_1$ to the lower stage toroidal coil $L_2$ at the inner circumferential side is soldered to a first coil connection pattern $P_1$ on the printed circuit board 11. The method of production of this toroidal coil L is to wind a wire from the second winding terminal $T_2$ side in one direction in several layers to form the lower stage toroidal coil $L_2$, then wind it in the opposite direction in several layers to form the upper stage toroidal coil $L_1$, run a cross wire G (see FIG. 6) along the base line direction of the lower stage toroidal coil $L_2$ at the inner circumferential surface, and cause the first winding terminal $T_1$ to bulge out from the end face. Note that, this cross wire G can be pulled around to the outer circumferential surface of the toroidal coil L and brought to the end face of the lower stage toroidal coil $L_2$.

In this example, the inner circumferential edge of the top pole piece plate 4 bulges out somewhat from the inner circumferential surface of the ring-shaped permanent magnet 3 to the upper stage toroidal coil $L_1$ side and the inner circumferential edge of the bottom pole piece plate 5 bulges out from the inner circumferential surface of the ring-shaped permanent magnet 3 to the lower stage toroidal coil $L_2$ side.

The top plate spring 6 has spiral elastic wires 6c and 6d extending in an approximately 360° spiral shape from 180° rotationally symmetric positions of the outer circumferential side edges of the ring-shaped inner circumference side hanging part 6a and connecting to the inner circumference side edge of the ring-shaped outer circumference side hanging part 6b. The bottom plate spring 7 also has spiral elastic wires 7c and 7d extending in an approximately 360° spiral shape from 180° rotationally symmetric positions of the outer circumferential side edges of the ring-shaped inner circumference side hanging part 7a and connecting to the inner circumference side edge of the ring-shaped outer circumference side hanging part 7b.

The stainless steel or SPCC end plate 10 is recessed at the back surface side for accommodation of the printed circuit board 11. It has a positioning piece 10c. At the opposite side, a conductive projection 10b bulging out to the back surface side is press-formed. A through hole 10a is not a true circle, but has a straight edge N forming a chord for leaving room for forming the conductive projection 10b.

The printed circuit board 11 is provided, at its front surface side, with not only a first coil connection pattern $P_1$ and a second coil connection pattern $P_2$, but also a ring-shaped coil receiving pattern M mounting the toroidal coil L and fan-shaped reinforcement patterns $f_1$ to $f_3$ surrounding this coil receiving pattern M in three directions and is provided, at its back surface side, with a first terminal connection pattern $Q_1$ and second terminal connection pattern $Q_2$ for connection via the through holes to the first coil connection pattern $P_1$ and second coil connection pattern $P_2$, and soldering to the conical bottom surface sides of the spring terminals $S_1$ and $S_2$ and a reinforcement pattern F surrounding the notch 11a and extending between the first terminal connection pattern $Q_1$ and second terminal connection pattern $Q_2$.

In the present example, the end plate 10 is provided with the through hole 10a so as to thereby, as shown in FIG. 5A to FIG. 7C, enable the case side structure 20 and the back lid side structure 30 to be assembled and a vibration linear actuator 1 to be obtained. The case side structure 20 is formed by assembling the recessed case 9, the columnar core 8 fastened implanted at the bottom surface of this recessed case 9, the ring-shaped weight 2, ring-shaped permanent magnet 3, the top pole piece plate 4, the bottom pole piece plate 5, the top plate spring 6, the bottom plate spring 7, and the end plate 10, then injecting the magnetic fluid 13 through the through hole 10a of the end plate 10 to coat the inner circumferential surface of the ring-shaped permanent magnet 3. On the other hand, the back lid side structure 30 includes the toroidal coil L, the protective tubular member 12, and the rubber damper 14 mounted on the printed circuit board 11 and the spring terminals $S_1$ and $S_2$ connected to the back surface of the printed circuit board 11 and bonded to the rubber sheet 16. The columnar core 8 of the case side structure 20 is fit through the through hole 10a of the end plate 10 and into the hollow part of the toroidal coil L, and the printed circuit board 11 is bonded to the recess at the back surface side of the end plate 10. After this, the crescent-shaped conductive rubber piece 15 is bonded to the back surface of the printed circuit board 11, and a double-sided tape 17 is stuck to the recessed case 9.

Figure 8A:
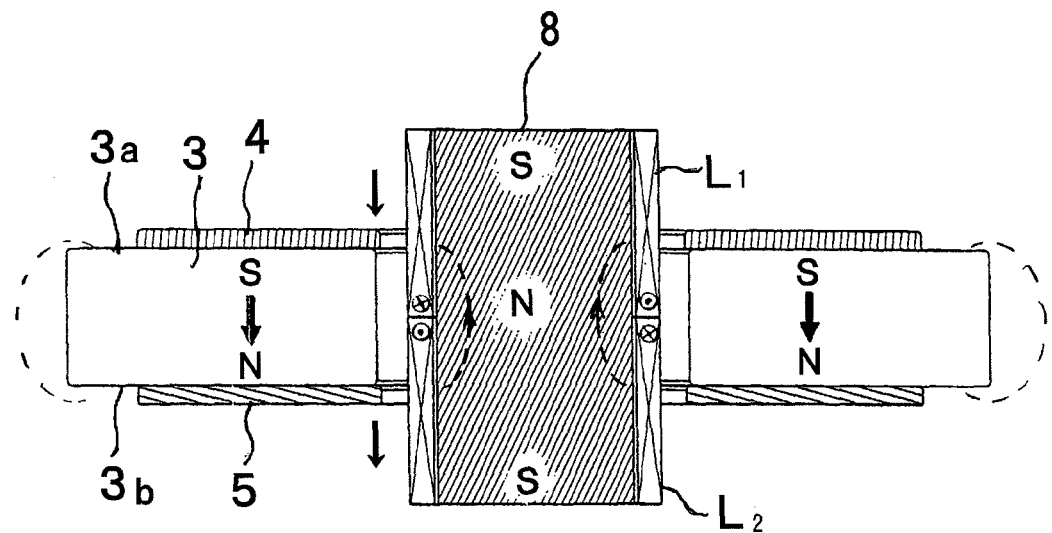
FIGS. 8A and 8B are schematic views which explain a vibration mode of a vibration linear actuator according to a first embodiment.
Figure 8B:
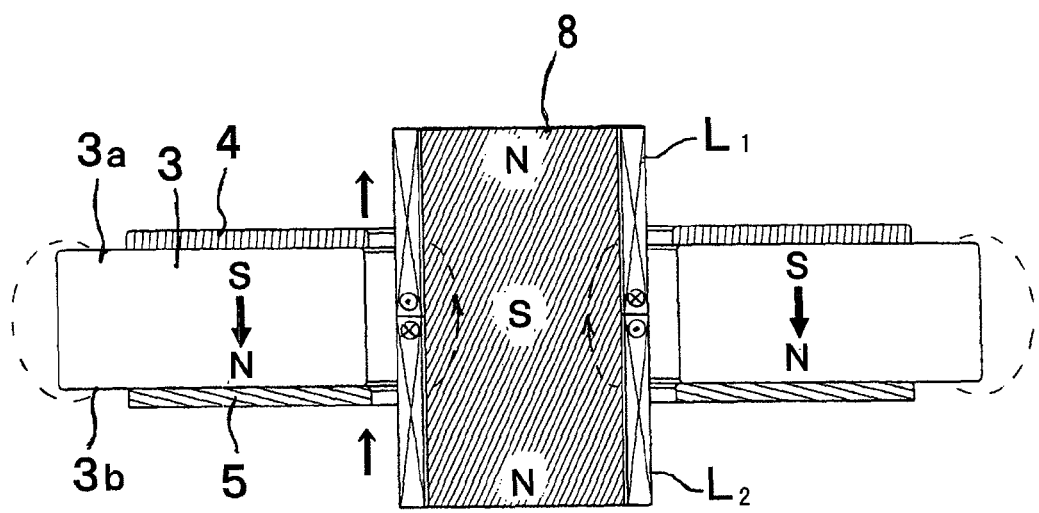

In this embodiment, as shown in FIGS. 8A and 8B, almost all of the magnetic field lines emerging from the bottom end face (N pole face) 3b run through the bottom pole piece 5 to pass from the inner circumferential edge through the lower toroidal coil $L_2$ and enter the columnar core 8, then run in the axial direction, pass through the upper toroidal coil $L_1$ to jump to the inner circumferential edge of the top pole piece 4, run through the inside of it, and return to the top end face (S pole face) 3a. For this reason, by the concentrated flux path between the inner circumferential edge of the bottom pole piece 5 and the columnar core 8 and the concentrated flux path between the inner circumferential edge of the top pole piece 4 and columnar core 8, electromagnetic forces are generated. In the state where the direction of current flowing through the lower toroidal coil $L_2$ and the upper toroidal coil $L_1$ is as shown in FIG. 8A, a counteraction force to the electromagnetic force occurs in the arrow direction and the ring-shaped permanent magnet 3 is made to vibrate, while in the state shown in FIG. 8B where the current direction switches, a counteracting force occurs in the arrow direction and the ring-shaped permanent magnet 3 is made to vibrate in the reverse direction. This contributes to improvement of the vibration intensity or lower power consumption.

Further, in the state of FIG. 8A, the end face of the columnar core 8 at the upper toroidal coil $L_1$ side is the S pole, while the end face of the columnar core 8 at the lower toroidal coil $L_2$ side is also the S pole, so the magnetic attraction and repulsion force with the ring-shaped permanent magnet 3 acts in the same direction as the above-mentioned counteracting force. In the state of FIG. 8B, the end face of the columnar core 8 at the upper toroidal coil $L_1$ side is the N pole and the end face of the columnar core 8 at the lower toroidal coil $L_2$ side is also the N pole, so the magnetic attraction and repulsion force with the ring-shaped permanent magnet 3 acts in the same direction as the above counteracting force. Such a magnetic attraction and repulsion force is superposed on the electromagnetic force, so this contributes even more to the improvement of the vibrating strength or lower power consumption. However, the magnetic force lines pass through the inside of the columnar core 8 by a short-circuit magnetic path, so it is possible to lower the magnetic resistance, but in the state of FIG. 8A, since the center part in the columnar core 8 becomes the N pole, the magnetic resistance of the path from the lower toroidal coil $L_2$ side toward this center part in the magnetization direction is extremely low, while the magnetic resistance of the path from the center part toward the upper toroidal coil $L_1$ side in the counter magnetization direction is high. In the state of FIG. 8B, since the center part ins the columnar core 8 becomes the S pole, the magnetic resistance of the path from the lower toroidal coil $L_2$ side toward this center part in the counter magnetization direction is high, while the magnetic resistance of the path from the center part toward the upper toroidal coil $L_1$ side is extremely low.

The magnetized direction of the ring-shaped permanent magnet 3 is substantially parallel to the direction of the columnar core 8 in the toroidal coil L. In the flux emerging from the first end face 3a or second end face 3b of the ring-shaped permanent magnet 3, the flux sneaking around to the inner circumference side jumps over the gap to the outer circumferential surface of the columnar core 8 and passes through the inside of the columnar core 8, so the magnetic fluid 13 interposed in the clearance between the outer circumferential surface of the protective tubular member 12 and the inner circumferential surface of the ring-shaped permanent magnet 3 is sealed in state by the flux jumping over the gap. Regardless of the posture of the reciprocating vibration generator, it is therefore possible to prevent leakage of magnetic fluid 13. Further, due to the magnetic fluid 13 acting as this buffer layer, even if external force of impact is given, it is possible to effectively keep the reciprocating vibrator from sharply striking the toroidal coil L and therefore possible to prevent damage to the toroidal coil L. It is also possible to not use the magnetic fluid 13 and instead cover the toroidal coil L with the protective tubular member 12 so as to protect the toroidal coil L from damage due to being sharply struck by the reciprocating vibrator. Since there is the protective tubular member 12, the gap with the ring-shaped permanent magnet 3 can be made very small. This contributes to the reduction of size of the reciprocating vibration generator. Further, since the gap is very small, it is not necessary to use a high viscosity magnetic fluid 13 which is not excellent in low temperature characteristics. It is sufficient to use low viscosity, inexpensive magnetic fluid 13 which is excellent in low temperature characteristics. Note that, this protective tubular member 12 is preferably made of a slippery material. It may be a metal material or plastic material of course and may also be a heat shrinkable tube.

The top pole piece plate 4 is superposed at the top end face 3a of the ring-shaped permanent magnet 3, while the bottom pole piece plate 5 is superposed at the bottom end face 3b of the ring-shaped permanent magnet 3, so the inner circumferential surface of the top pole piece plate 4 trapping the flux at the top end face 3a side and the inner circumferential surface of the bottom pole piece plate 5 trapping the flux at the bottom end face 3b side approach the outer circumferential surface of the columnar core 8 whereby the magnetic resistance is lowered. Further, the flux density for jumping over this gap becomes high, so it is possible to further improve the vibration strength or lower the power consumption and it is possible to rapidly attenuate the vibration. Further, the sealing ability of the magnetic fluid 13 is improved.

In particular, in the present example, the inner circumferential surfaces of the top pole piece plate 4 and the bottom pole piece plate 5 bulge out from the inner circumferential surface of the ring-shaped permanent magnet 3 to the protective tubular member 12 side, so the flux density for jumping the gap between the inner circumferential surfaces of the pole piece plates 4 and 5 and the outer circumferential surface of the columnar core 8 becomes higher, so the ability to seal in the magnetic fluid 13 is raised.

Further, the outer circumferential surface of the toroidal coil L is covered by the protective tubular member 12 such as a heat-shrinkable tube or other member, so at the time of impact due to being dropped etc., it is possible to prevent the inner circumferential surface of the ring-shaped permanent magnet 3 from sharply striking the outer circumferential surface of the toroidal coil L and possible to protect the actuator from coil breakage problems.

Magnetic fluid 13 is interposed between the outer circumferential surface of the protective tubular member 12 and the inner circumferential surface of the ring-shaped permanent magnet 3, so even if an external force of impact is applied, the magnetic fluid 13 becomes a buffer material, so it is possible to effectively suppress sharp impact of the ring-shaped permanent magnet 3 to the protective tubular member 12. Note that, even when there is no protective tubular member 12, since magnetic fluid 13 is interposed between the outer circumferential surface of the toroidal coil L and the inner circumferential surface of the ring-shaped permanent magnet 3, it is possible to keep the inner circumferential surface of the ring-shaped permanent magnet 3 from striking the outer circumferential surface of the toroidal coil L.

In the assembled structure of the vibration linear actuator 1, the end plate 10 has a through hole 10a of a size enabling passage of the toroidal coil L, so not only is it possible to simply inject magnetic fluid 13 through this through hole 10a to coat the inner circumferential surface of the ring-shaped permanent magnet 3, but also, after this, it is possible to insert the toroidal coil L from this through hole 10a and fasten the printed circuit board 11 to the back surface of the end plate 10 and possible to try to facilitate production.

To prevent the generation of electromagnetic interference from the vibration linear actuator 1, it is necessary to ground and shield the outer housing having the recessed case 9 and the end plate 10. As the structure for feeding a ground potential to the end plate 10, the end plate 10 has the conductive projection 10b contacting the conductive rubber piece 15 adhered to the back surface of the printed circuit board 11 through the notch 11a framed in the printed circuit board 11. This is not a structure where the end plate 10 contacts a pattern of the printed circuit board 11, but a structure directly connecting the conductive projection 10b of the end plate 10 and the conductive rubber piece 15, so it is possible to obtain the conductive projection 10b when press-forming the end plate 10 and possible to realize lower cost.

Note that, in this example, the series connection lower stage toroidal coil $L_1$ and upper stage toroidal coil $L_2$ were explained, but a parallel connection structure of the two coils may also be employed for reducing the resistance loss. Further, as the mechanical vibrator, it is also possible to eliminate the ring-shaped weight 2 and just use the large ring-shaped permanent magnet 3.

Second Embodiment

Figure 9A:
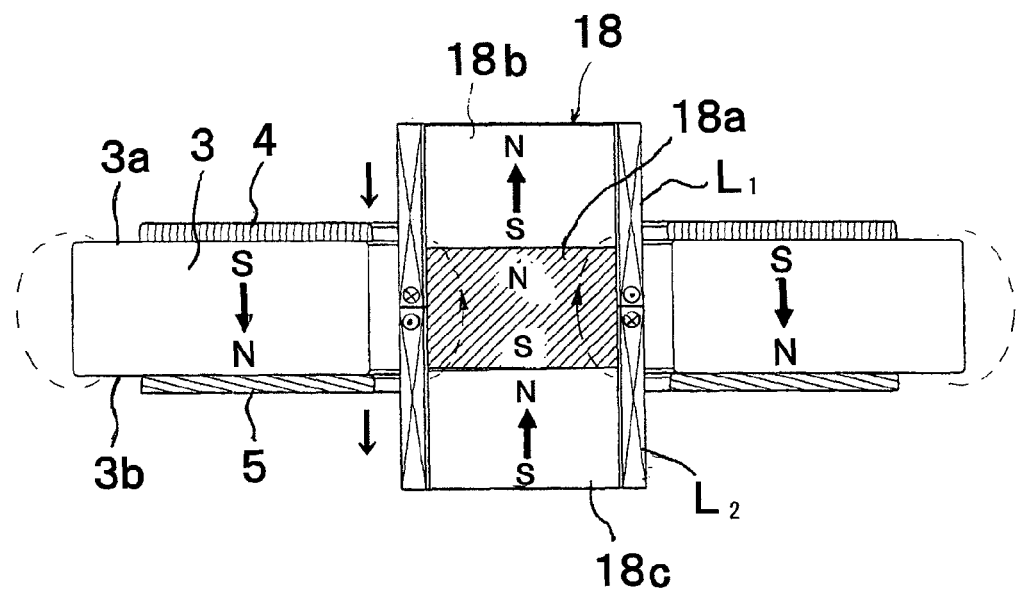
FIGS. 9A and 9B are schematic views which explain a vibration mode of a vibration linear actuator according to a second embodiment.
Figure 9B:
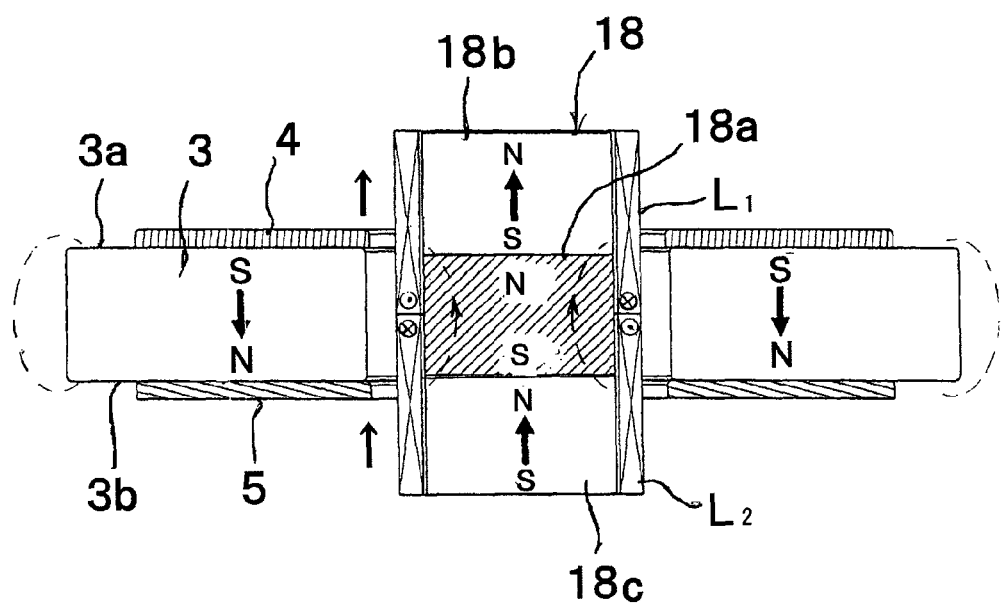

The point of difference of the vibration linear actuator of the second embodiment shown in FIGS. 9A and 9B from the vibration linear actuator of the first embodiment 1 lies in the configuration of a columnar core 18. The columnar core 18 has a center core (center iron core member) 18a which fits inside the lower toroidal coil $L_2$ and the upper toroidal coil $L_1$ straddling the two, a bottom permanent magnet (permanent magnet core member) 18c which has an N pole face provided in an inside the lower toroidal coil $L_2$ and overlaid on one end face of the center core 18a, and a top permanent magnet 18b which has an S pole face provided in an inside the top toroidal coil $L_1$ and overlaid on another end face of the center core 18a. Note that the rest of the configuration is the same as the first embodiment.

In such a configuration of the columnar core 18, even if the feed of current to the toroidal coils $L_1$ and $L_2$ alternates, the magnetization direction of the center core 18a is determined by the magnetization of the bottom permanent magnet 18c and the top permanent magnet 18b, so the magnetic force lines which run from the bottom pole piece 5 through the lower toroidal coil $L_2$ to the columnar core 18 run from the magnetization direction of the bottom permanent magnet 18c through the magnetization direction of the center core 18a and through the magnetization direction of the top permanent magnet 18b to pass through the top toroidal coil $L_1$ and flow into the top pole piece 4, so it is possible to further decrease the magnetic resistance in the columnar core 18. This contributes to strengthening of the vibrating force and reduction in size of the device.

Third Embodiment

Figure 10A:
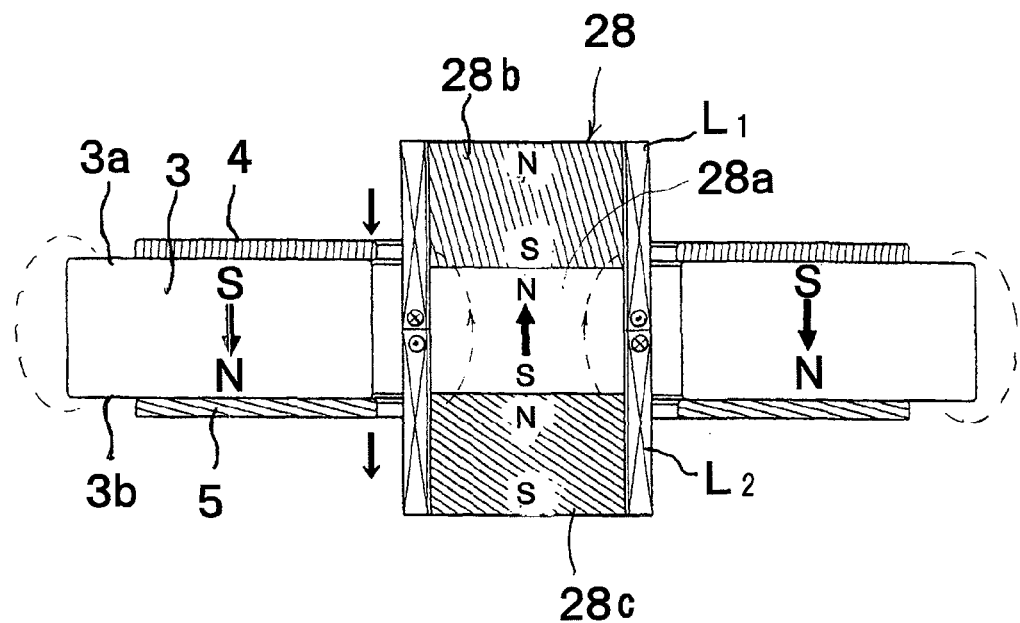
FIGS. 10A and 10B are schematic views which explain a vibration mode of a vibration linear actuator according to a third embodiment.
Figure 10B:
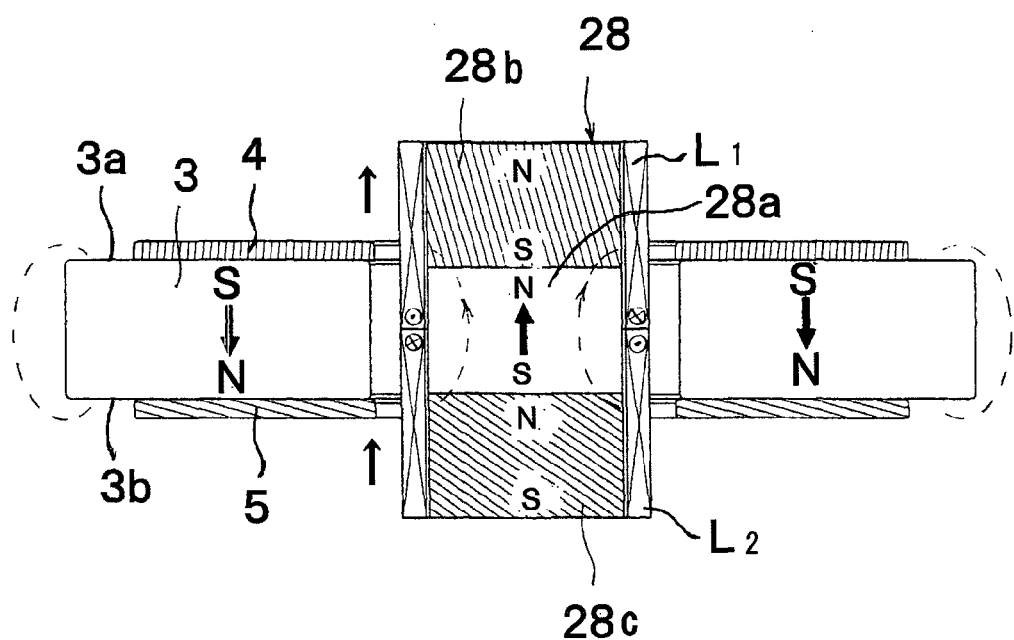

A columnar core 28 of a vibration linear actuator of the third embodiment shown in FIGS. 10A and 10B, opposite to the configuration of the columnar core 18 of the second embodiment, has a center permanent magnet 28a which fits inside the lower toroidal coil $L_2$ and the upper toroidal coil $L_1$ straddling the two and which has a magnetization direction of the reverse direction from the magnetization direction of the ring-shaped permanent magnet 3, a bottom core (iron core member) 28c provided in an inside the lower toroidal coil $L_2$ and overlaps the S pole face of the center permanent magnet 28a, and a top core 28b provided in an inside the upper toroidal coil $L_1$ and overlaps the N pole face of the center permanent magnet 28a. The magnetization directions of the bottom core 28c and top core 28b match the magnetization direction of the center permanent magnet 28a, so the magnetic force lines which run from the bottom pole piece 5 through the lower toroidal coil $L_2$ to enter the columnar core 28 run through the magnetization direction of the bottom core 28c through the magnetization direction of the top core 28b to pass through the top toroidal coil $L_1$ and flow into the top pole piece 4. For this reason, it is possible to further decrease the magnetic resistance inside the columnar core 28. This contributes to strengthening of the vibrating force and reduction in size of the device.

Fourth Embodiment

Figure 11A:
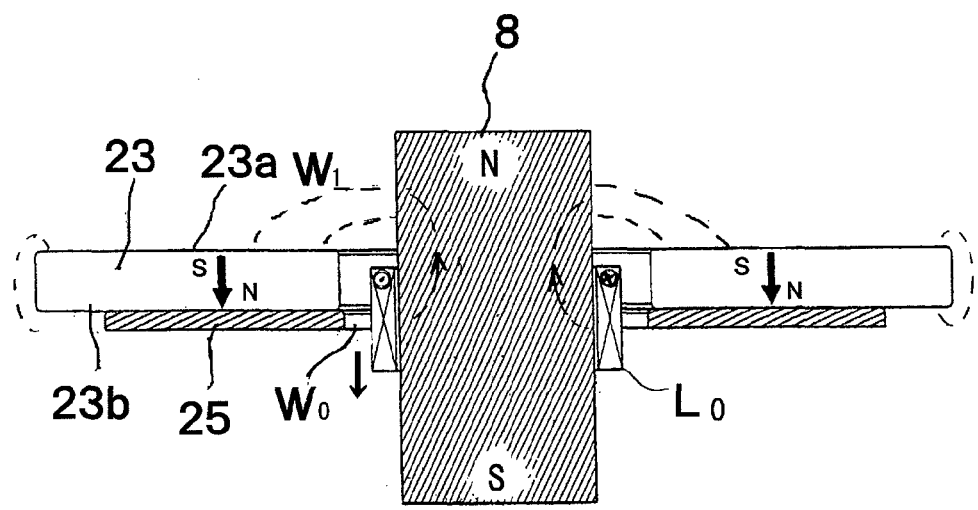
FIGS. 11A and 11B are schematic views which explain a vibration mode of a vibration linear actuator according to a fourth embodiment.
Figure 11B:
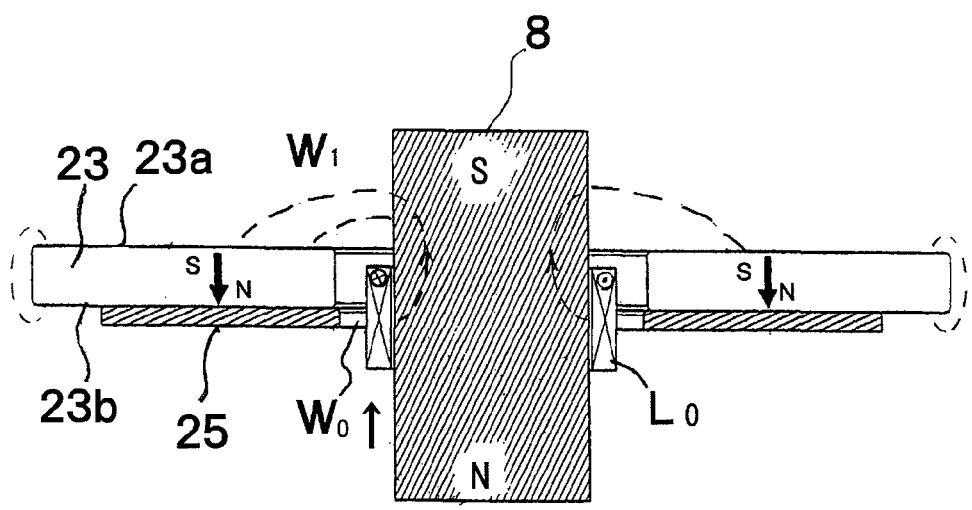

A vibration linear actuator of the fourth embodiment shown in FIGS. 11A and 11B is configured simplified over the vibration linear actuator of the first embodiment shown in FIGS. 8A and 8B. Instead of the ring-shaped permanent magnet 3, it has a thin top ring-shaped permanent magnet 23 having an N pole face on which a sole ring-shaped pole piece 25 is overlaid. Further a sole center toroidal coil $L_0$ is fit over the columnar core 8.

The magnetic force lines from the N pole face 23b to the S pole face 23a form a short-circuit closed loop with a low magnetic resistance. The short-circuit closed loop includes a concentrated flux path $W_0$ for generating electromagnetic force which runs across the current flowing through the center toroidal coil $L_0$ between the inner circumferential edge of the pole piece 25 and the outer circumferential surface of the columnar core 8, an air gap flux path $W_1$ between the outer circumferential surface of the columnar core 8 and the S pole face 23a with no pole piece, and a low magnetic resistance path in the columnar core 8. For this reason, at the top ring-shaped permanent magnet 23, a counteracting force of the electromagnetic force is alternately generated.

Further, the magnetic force lines at the outer circumference side part of the top ring-shaped permanent magnet 23 among the N pole face 23b and the S pole face 23a are short-circuited in the thickness direction of the top ring-shaped permanent magnet 23, so there are no detrimental effects on the concentrated flux path $W_0$ or the air gap flux path $W_1$. Therefore, a reduction of size of the device can be realized.

Fifth Embodiment

Figure 12A:
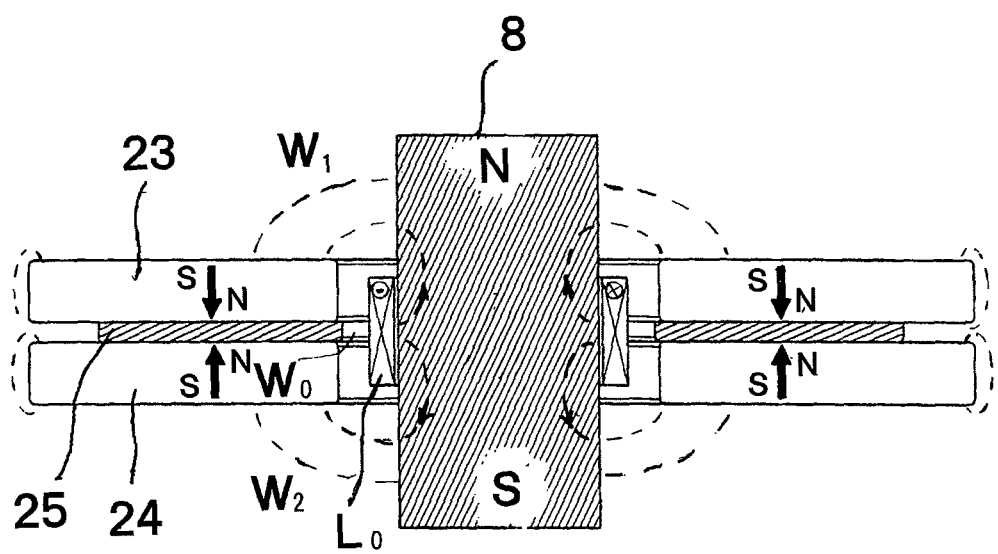
FIGS. 12A and 12B are schematic views which explain a vibration mode of a vibration linear actuator according to a fifth embodiment.
Figure 12B:
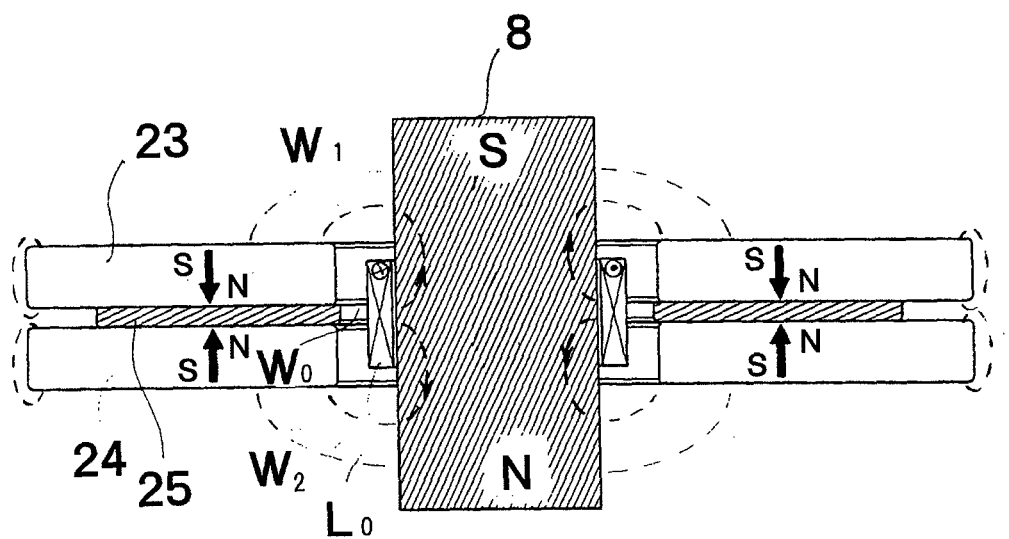

A vibration linear actuator of the fifth embodiment shown in FIGS. 12A and 12B is configured as the vibration linear actuator of the fourth embodiment shown in FIGS. 11A and 11B plus a bottom ring-shaped permanent magnet 24. The ring-shaped pole piece 25 is sandwiched between the N pole face of the top ring-shaped permanent magnet 23 and the N pole face of the bottom ring-shaped permanent magnet 24. The magnetic force lines coming from the inner circumferential edge of the ring-shaped pole piece 25 run through the concentrated flux path $W_0$ to pass through the center toroidal coil $L_0$ where they are then branched into two. One part passes through the columnar core 8 toward the top and runs through the air gap flux path $W_1$ to jump to the S pole face of the top ring-shaped permanent magnet 23, while the other passes through the columnar core 8 toward the bottom and runs through the air gap flux path $W_2$ to jump to the S pole face of the bottom ring-shaped permanent magnet 24. In this configuration as well, electromagnetic force is generated by the concentrated flux path $W_0$ from the inner circumferential edge of the pole piece 25. Inside the columnar core 8, the magnetic resistance is low, so drive with a high vibrating force is possible. Further, the magnetic force lines at the outer circumference side parts of the top ring-shaped permanent magnet 23 and bottom ring-shaped permanent magnet 24 are short-circuited in the thickness direction, so there are no detrimental effects on the concentrated flux path $W_0$ or the air gap flux paths $W_1$ and $W_2$. Therefore, a reduction of size of the device can be realized.

Sixth Embodiment

Figure 13A:
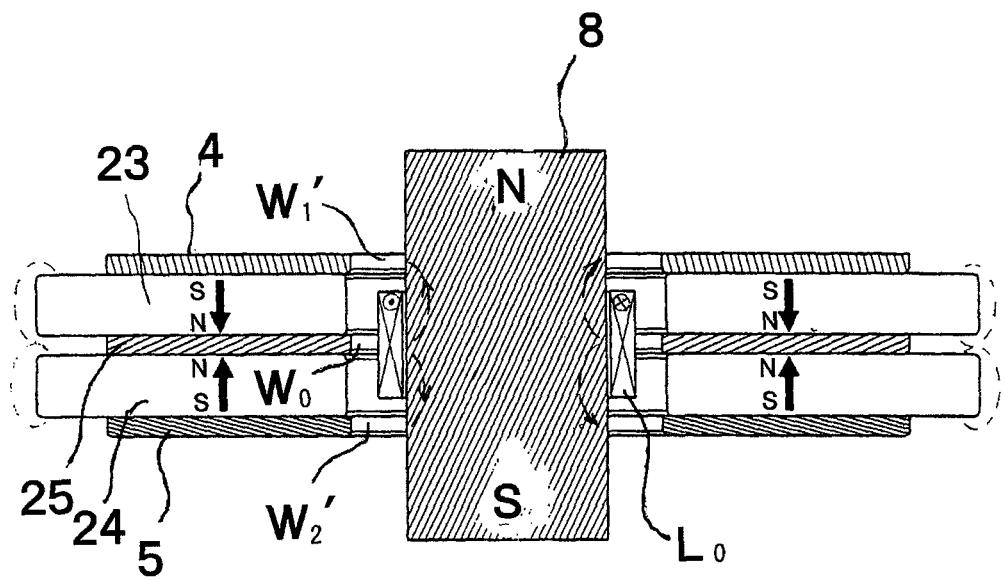
FIGS. 13A and 13B are schematic views which explain a vibration mode of a vibration linear actuator according to a sixth embodiment.
Figure 13B:
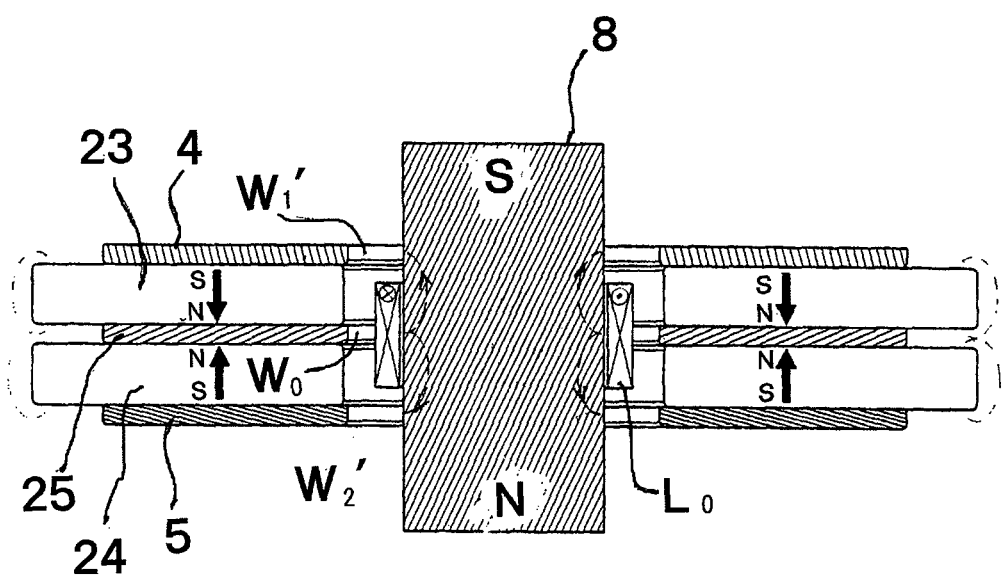

A vibration linear actuator of the sixth embodiment shown in FIGS. 13A and 13B is configured as the vibration linear actuator of the fifth embodiment shown in FIGS. 12A and 12B plus the ring-shaped top pole piece 4 and the bottom pole piece 5. By the addition of the top pole piece 4 and the bottom pole piece 5, it is possible to make the air gap flux paths $W_1$ and $W_2$ in FIGS. 12A and 12B to be the concentrated flux paths $W_1'$ and $W_2'$ between the inner circumferential edges of the top pole piece 4 and bottom pole piece 5 and the columnar core 8, possible to lower the magnetic resistance, and possible to drive the device with a high vibrating force.

Seventh Embodiment

Figure 14A:
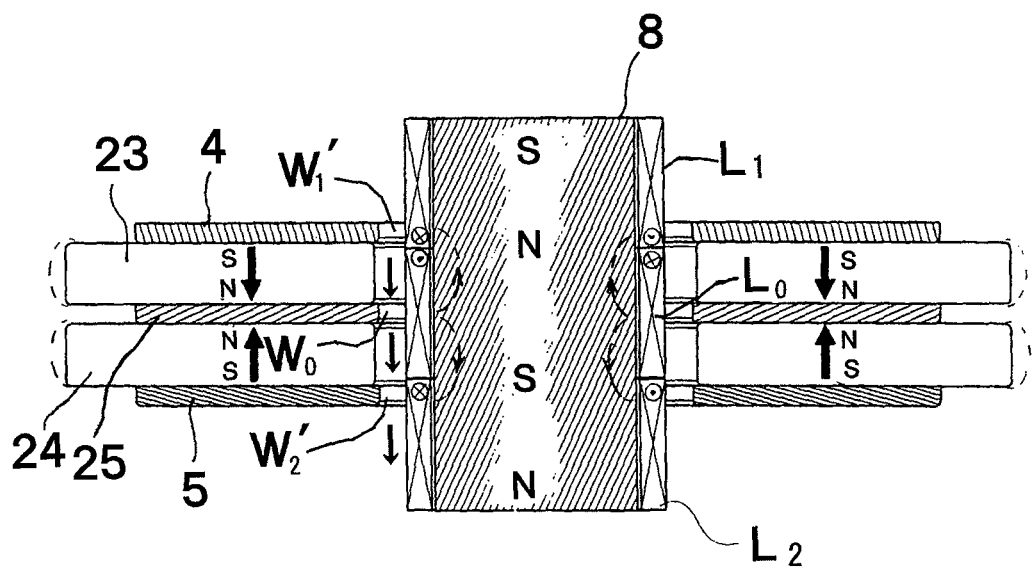
FIGS. 14A and 14B are schematic views which explain a vibration mode of a vibration linear actuator according to a seventh embodiment.
Figure 14B:
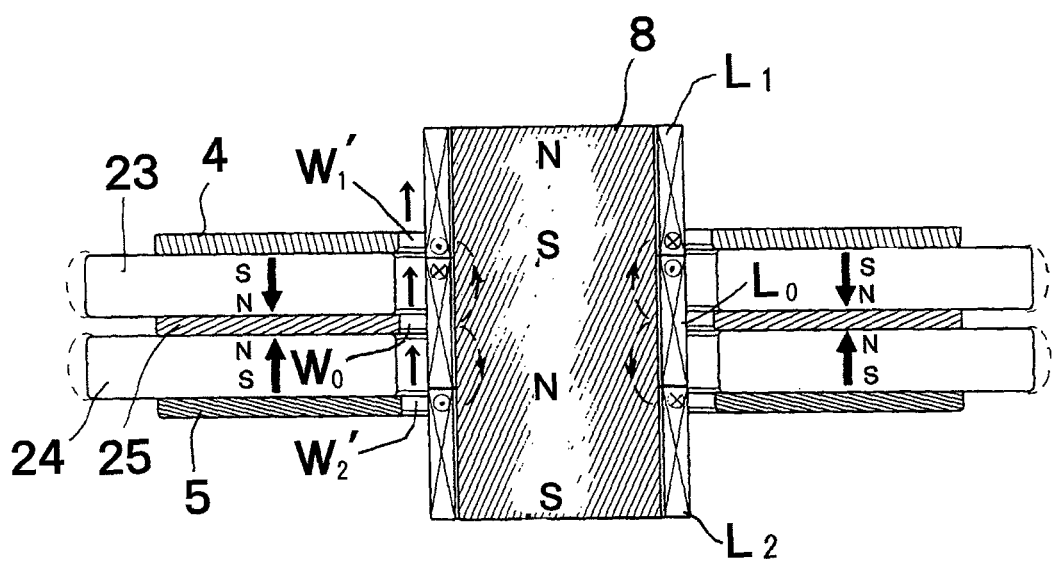

A vibration linear actuator of the seventh embodiment shown in FIGS. 14A and 14B is configured as the vibration linear actuator of the sixth embodiment shown in FIGS. 13A and 13B plus the lower toroidal coil $L_2$ and the upper toroidal coil $L_1$. The center toroidal coil $L_0$ and the lower toroidal coil $L_2$ are wound oppositely and connected in series, while the center toroidal coil $L_0$ and upper toroidal coil $L_1$ are wound oppositely and connected in series. The magnetic force lines emerging from the inner circumferential edge of the ring-shaped pole piece 25 run through the concentrated flux path $W_0$ and pass through the center toroidal coil $L_0$ where they are then branched into two. One part passes through the inside of the columnar core 8 toward the top and runs through the concentrated flux $W_1'$ to jump to the inner circumferential edge of the top pole piece 4, while the other passes through the inside of the columnar core 8 toward the bottom and runs through the concentrated flux $W_2'$ to jump to the inner circumferential edge of the bottom pole piece 5. For this reason, by the concentrated flux paths $W_1'$ and $W_2'$ also, electromagnetic force is generated, so the drive force is strengthened. Furthermore, in the current carrying state of FIG. 14A, the top end face of the columnar core 8 is the S pole face and the top pole piece 4 is the S pole face, so the two magnetically repulse each other, while the bottom end face of the columnar core 8 is the N pole face and the bottom pole piece 5 is the S pole face, so the two magnetically attract each other. From the viewpoint of magnetic attraction and repulsion, as well, the drive force is augmented. Further, in the current carrying state of FIG. 14B, the top end face of the columnar core 8 is the N pole face and the top pole piece 4 is the S pole face, so the two magnetically attract each other, while the bottom end face of the columnar core 8 is the S pole face and the bottom pole piece 5 is the S pole face, so the two magnetically repulse each other. From the viewpoint of magnetic attraction and repulsion, as well, the drive force is augmented.

However, in the current carrying state of FIG. 14A, the magnetic flux which passes through the inside of the columnar core 8 downward is opposite in direction from the magnetization direction of the electromagnet, so the magnetic resistance is high. Further, in the current carrying state of FIG. 14B, the magnetic flux which passes through the inside of the columnar core 8 upward is opposite in direction from the magnetization direction of the electromagnet, so the magnetic resistance is high.

Eighth Embodiment

Figure 15A:
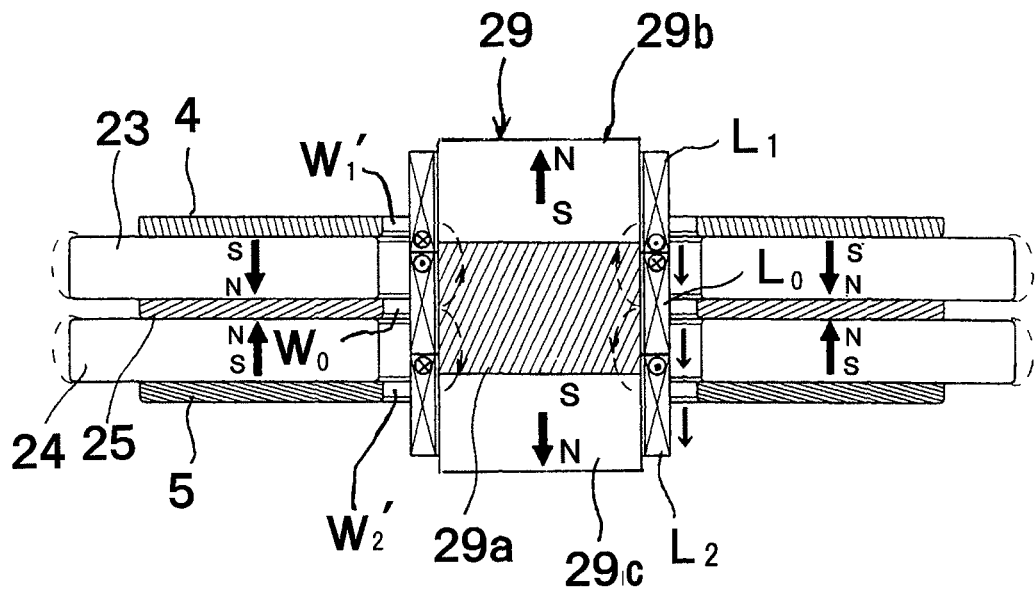
FIGS. 15A and 15B are schematic views which explain a vibration mode of a vibration linear actuator according to an eighth embodiment.
Figure 15B:
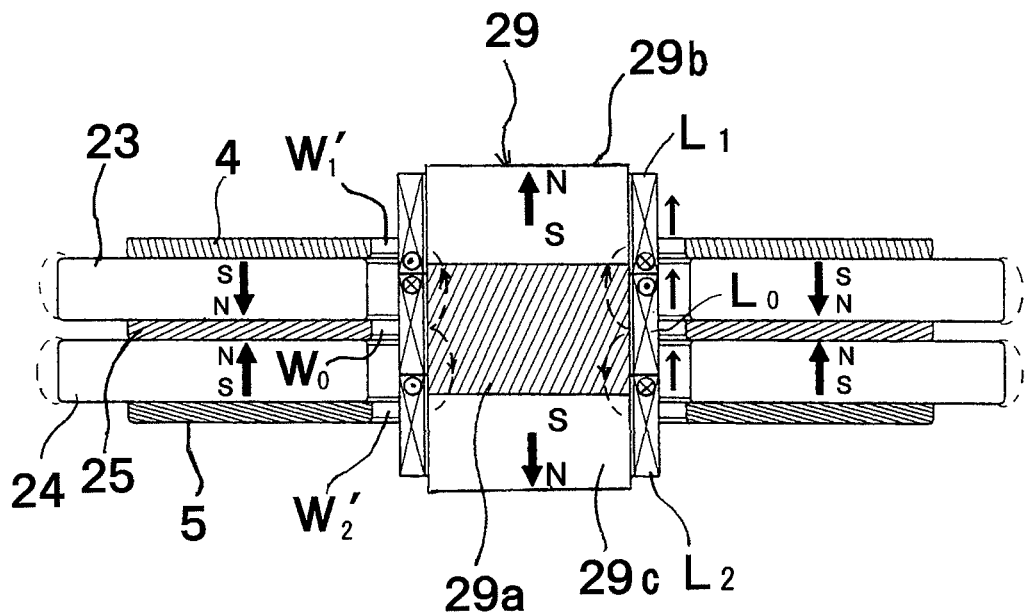

A vibration linear actuator of the eighth embodiment shown in FIGS. 15A and 15B is an improvement of the vibration linear actuator of the seventh embodiment shown in FIGS. 14A and 14B. Instead of the columnar core 8 of FIGS. 14A and 14B, a columnar core 29 includes a center core 29a which spans the lower toroidal coil $L_2$ and the upper toroidal coil $L_1$ and which has a center at the inside of the center toroidal coil $L_0$, a bottom permanent magnet 29c which has an S pole face overlaid on the bottom end face of the center core 29a inside the lower toroidal coil $L_2$, and a top permanent magnet 29b which has an S pole face overlaid on the top end face of the center core 39a inside the upper toroidal coil $L_1$.

The magnetic force lines emerging from the inner circumferential edge of the ring-shaped pole piece 25 run through the concentrated flux path $W_0$ and pass through the center toroidal coil $L_0$ where they are then branched into two. The magnetic flux branched downward runs through the almost completely nonmagnetized state center core 29a and passes through the magnetization direction of the bottom permanent magnet 29c to head toward the lower toroidal coil $L_2$, while the magnetic flux branched upward runs through the almost completely nonmagnetized state center core 29a and passes through the magnetization direction of the top permanent magnet 29b to head toward the upper toroidal coil $L_1$, so compared with the case of the seventh embodiment of FIGS. 14A and 14B, the magnetic resistance becomes lower, so the drive force is increased. Further, in both of the current carrying states of FIG. 15A and FIG. 15B, the electromagnetic forces generated by the concentrated flux paths $W_1'$, $W_2'$ are balanced.

However, even in the current carrying state of FIG. 15A and FIG. 15B, the N pole face of the top permanent magnet 29b and the top pole piece 4 magnetically attract each other and, the N pole face of the bottom permanent magnet 29c and the bottom pole piece 5 magnetically attract each other, so addition of drive force from the point of magnetic attraction and repulsion cannot be expected.

Ninth Embodiment

Figure 16A:
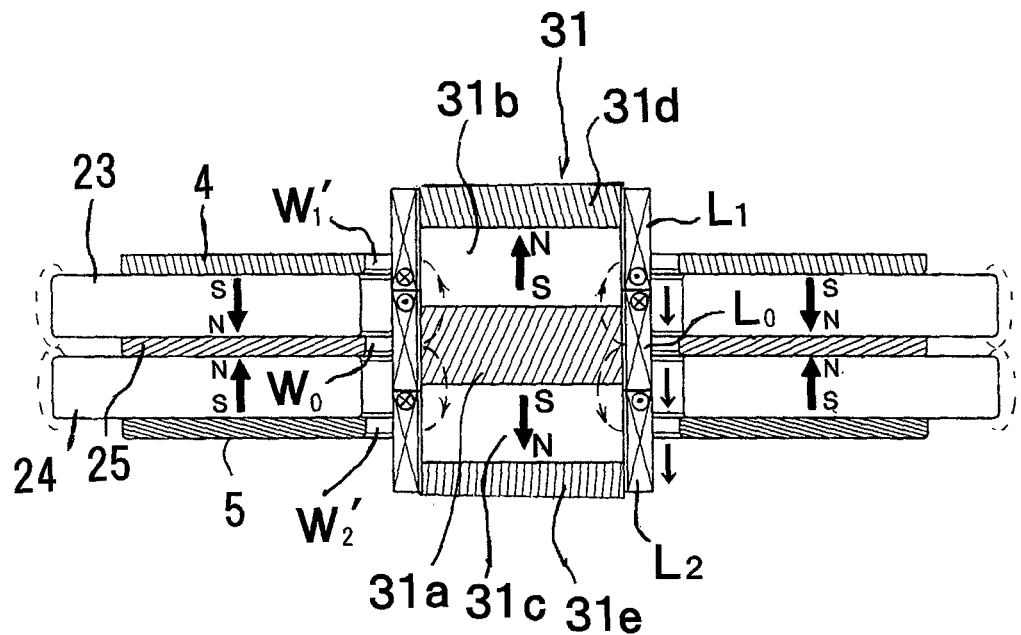
FIGS. 16A and 16B are schematic views which explain a vibration mode of a vibration linear actuator according to a ninth embodiment.
Figure 16B:
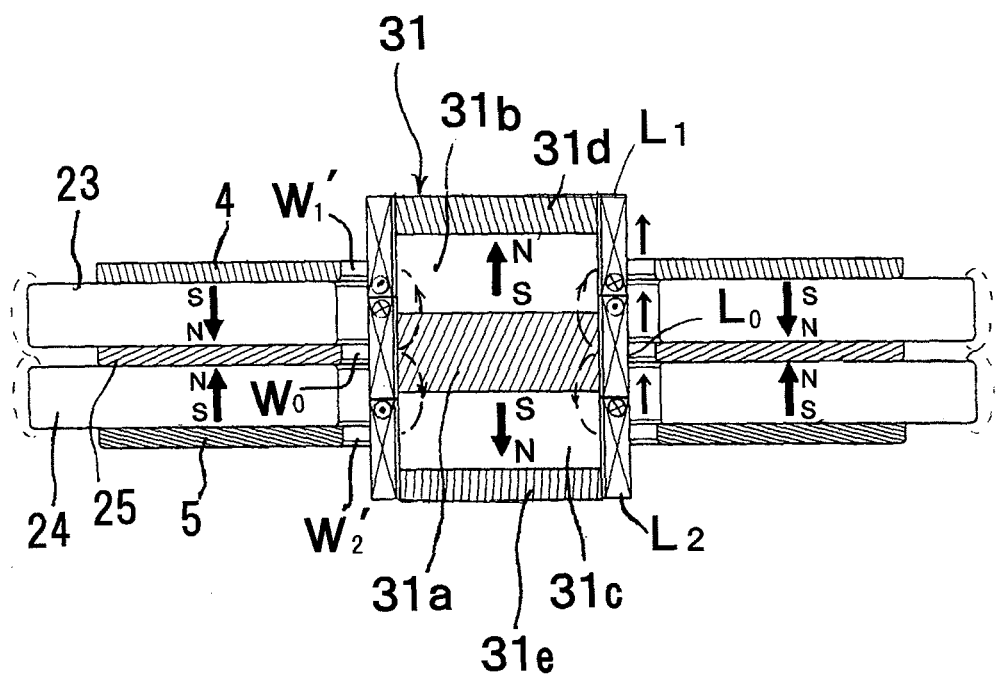
Figure 17:
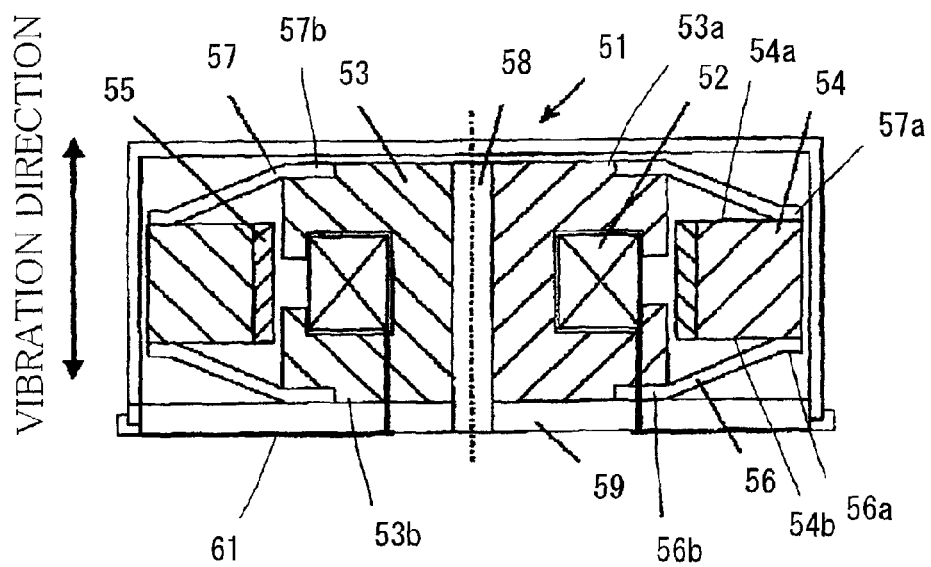
FIG. 17 is a longitudinal cross-sectional view showing a conventional vibration linear actuator.

A vibration linear actuator of the ninth embodiment shown in FIGS. 16A and 16B is a separate structure from the vibration linear actuator of the eighth embodiment shown in FIGS. 15A and 15B. A columnar core 31 has a center core 31a which is fit inside the center toroidal coil $L_0$, a bottom permanent magnet 31c provided in an inside of this center toroidal coil $L_0$ and the lower toroidal coil $L_2$ and having an S pole face overlapping a bottom end face of the center core 31a, a top permanent magnet 31b provided in an inside the center toroidal coil $L_0$ and upper toroidal coil $L_1$ and having an S pole face overlapping the center core 31a, a bottom end core 31e which overlaps an N pole face of the bottom permanent magnet 31c inside the lower toroidal coil $L_2$, and a top end core 31d which overlaps an N pole face of the top permanent magnet 31b inside the upper toroidal coil $L_1$.

In the vibration linear actuator of this ninth embodiment, in the same way as the vibration linear actuator of the eighth embodiment, the magnetic resistance is decreased.

Note that the illustrated polarities of the permanent magnets 3, 18b, 18c, 28a, 23, 24, 29b, 29c, 31b, and 31c of FIG. 3 to FIGS. 16A and 16B may be reversed in assembly as well.

While the invention has been described with reference to specific embodiments chosen for purpose of illustration, it should be apparent that numerous modifications could be made thereto by those skilled in the art without departing from the basic concept and scope of the invention.

The invention claimed is:

1. A vibration generator comprising: a mechanical vibrator having a first ring-shaped permanent magnet with a front and back comprised of an N pole face and an S pole face; a fastening part supporting said mechanical vibrator in a plate thickness direction spanning said N pole face and said S pole face through a suspension spring means; a magnetic core member supported by said fastening part and passing through a center hole of said first ring-shaped permanent magnet; and a first toroidal coil fitting over an outer circumferential surface of said magnetic core member and facing an inner circumferential surface of said center hole, wherein said mechanical vibrator is provided with a first ring-shaped pole piece superposed over at least one magnetic pole face among said N pole face and said S pole face, said first ring-shaped pole piece having an inner circumferential edge approaching an outer circumferential surface of said first toroidal coil,
   wherein said mechanical vibrator further comprises a second ring-shaped pole piece superposed over one of said pole faces of said first ring-shaped permanent magnet, the magnetic polarity of said one of said pole faces being opposite to the magnetic polarity of said first ring-shaped pole piece, said second ring-shaped pole piece having an inner circumferential edge approaching said outer circumferential surface of said magnetic core member.

2. A vibration generator as set forth in claim 1, further comprising a second toroidal coil adjoining said first toroidal coil, fitting over said outer circumferential surface of said magnetic core member, and facing said inner circumferential surface of said center hole, said inner circumferential edge of said second ring-shaped pole piece approaching an outer circumferential surface of said second toroidal coil.

3. A vibration generator as set forth in claim 2, wherein: said first ring-shaped pole piece overlaps said S pole face of said first ring-shaped permanent magnet; said second ring-shaped pole piece overlaps said N pole face of said first ring-shaped permanent magnet; and said magnetic core member has: a center iron core member spanning in the inside of said first toroidal coil and said second toroidal coil; a first permanent magnet core member having an S pole face overlapped on one end face of said center iron core member in said first toroidal coil, and a second permanent magnet core member having an N pole face overlapped on another end face of said center iron core member in said second toroidal coil.

4. A vibration generator as set forth in claim 2, wherein: said first ring-shaped pole piece overlaps said S pole face of said first ring-shaped permanent magnet; said second ring-shaped pole piece overlaps said N pole face of said first ring-shaped permanent magnet; and said magnetic core member has: a center permanent magnet core member spanning in the inside of said first toroidal coil and said second toroidal coil, said center permanent magnet core member having a magnetization direction of a reverse direction to the magnetization direction of said first ring-shaped permanent magnet; a first iron core member overlapping said N pole face of said center permanent magnet core member in said first toroidal coil; and a second iron core member overlapping said S pole face of said center permanent magnet core member in said second toroidal coil.

5. A vibration generator as set forth in claim 2, wherein the outer circumferential surface of said second toroidal coil is covered by a protective tube.

6. A vibration generator as set forth in claim 1, wherein said first toroidal coil and said second toroidal coil are connected in series by windings wound in reverse directions.

7. A vibration generator as set forth in claim 6, wherein said fastening part has a recessed case and an end plate fastened to an open side of said recessed case, said first toroidal coil being stacked over said second toroidal coil in the same diameter, said second toroidal coil being mounted on a printed circuit board, and said end plate has a through hole of a size enabling passage of said first toroidal coil and said second toroidal coil.

8. A vibration generator as set forth in claim 7, wherein said end plate has a current carrying projection contacting a conductive rubber piece through a notch formed in said printed circuit board, said conductive rubber piece being adhered to a back surface of said printed circuit board.

9. A vibration generator as set forth in claim 1, wherein the outer circumferential surface of said first toroidal coil is covered by a protective tube.

10. A vibration generator as set forth in claim 9, wherein a magnetic fluid is interposed in the gap between said outer circumferential surface of said protective tube and said inner circumferential surface of said center hole of said ring-shaped permanent magnet.

11. A vibration generator comprising: a mechanical vibrator having a first ring-shaped permanent magnet with a front and back comprised of an N pole face and an S pole face; a fastening part supporting said mechanical vibrator in a plate thickness direction spanning said N pole face and said S pole face through a suspension spring means; a magnetic core member supported by said fastening part and passing through a center hole of said first ring-shaped permanent magnet; and a first toroidal coil fitting over an outer circumferential surface of said magnetic core member and facing an inner circumferential surface of said center hole, wherein said mechanical vibrator is provided with a first ring-shaped pole piece superposed over at least one magnetic pole face among said N pole face and said S pole face, said first ring-shaped pole piece having an inner circumferential edge approaching an outer circumferential surface of said first toroidal coil, wherein said mechanical vibrator has a second ring-shaped permanent magnet comprised of an N pole end face and an S pole end face, and said magnetic pole faces of the same poles of said first ring-shaped permanent magnet and said second ring-shaped permanent magnet sandwich said first ring-shaped pole piece.

12. A vibration generator as set forth in claim 11, wherein said mechanical vibrator further comprises a second ring-shaped pole piece and a third ring-shaped pole piece superposed over one of said pole faces of said first ring-shaped permanent magnet and said second ring-shaped permanent magnet, the magnetic polarity of said one of said pole faces being opposite to the magnetic polarity of said first ring-shaped pole piece, said second ring-shaped pole piece and said third ring-shaped pole piece having inner circumferential edges approaching said outer circumferential surface of said magnetic core member.

13. A vibration generator as set forth in claim 12, further comprising second and third toroidal coils adjoining said first toroidal coil, said first toroidal coil being provided between said second and third toroidal coils, fitting over said outer circumferential surface of said magnetic core member, and facing said inner circumferential surface of said center hole, the inner circumferential edges of said second and third ring-shaped pole pieces approaching corresponding outer circumferential surfaces of said second and third toroidal coils.

14. A vibration generator as set forth in claim 13, wherein said first toroidal coil and said second toroidal coil are connected in series by windings wound in reverse directions, and said first toroidal coil and said third toroidal coil are connected in series by windings wound in reverse directions.

15. A vibration generator as set forth in claim 13, wherein: said first ring-shaped pole piece overlaps said N pole face of said first ring-shaped permanent magnet; said second ring-shaped pole piece overlaps said S pole face of said first ring-shaped permanent magnet; said third ring-shaped pole piece overlaps said S pole face of said second ring-shaped permanent magnet; and said magnetic core member has: a center iron core member spanning in the inside of said first toroidal coil, said second toroidal coil and said third toroidal coil; a first permanent magnet core member having an S pole face overlapped on one end face of said center iron core member in said second toroidal coil, and a second permanent magnet core member having an S pole face overlapped on another end face of said center iron core member in said third toroidal coil.

16. A vibration generator as set forth in claim 13, wherein: said first ring-shaped pole piece overlaps said S pole face of said first ring-shaped permanent magnet; said second ring-shaped pole piece overlaps said N pole face of said first ring-shaped permanent magnet; said third ring-shaped pole piece overlaps said N pole face of said second ring-shaped permanent magnet; and said magnetic core member has: a center iron core member spanning in the inside of said first toroidal coil, said second toroidal coil and said third toroidal coil; a first permanent magnet core member having an N pole face overlapped on one end face of said center iron core member in said second toroidal coil, and a second permanent magnet core member having an N pole face overlapped on another end face of said center iron core member in said third toroidal coil.

17. A vibration generator as set forth in claim 13, wherein: said first ring-shaped pole piece overlaps said N pole face of said first ring-shaped permanent magnet; said second ring-shaped pole piece overlaps said S pole face of said first ring-shaped permanent magnet; said third ring-shaped pole piece overlaps said S pole face of said second ring-shaped permanent magnet; and said magnetic core member has: a center iron core member accommodated in the inside of said first toroidal coil; a first permanent magnet core member having an S pole face overlapped on one end face of said center iron core member in said first toroidal coil and second toroidal coil, a second permanent magnet core member having an S pole face overlapped on another end face of said center iron core member in said first toroidal coil and said third toroidal coil, a first end iron core member overlapping an N pole face of said first permanent magnet core member in said second toroidal coil, and a second end iron core member overlapping an N pole face of said second permanent magnet core member in said third toroidal coil.

18. A vibration generator as set forth in claim 13, wherein: said first ring-shaped pole piece overlaps said S pole face of said first ring-shaped permanent magnet; said second ring-shaped pole piece overlaps said N pole face of said first ring-shaped permanent magnet; said third ring-shaped pole piece overlaps said N pole face of said second ring-shaped permanent magnet; and said magnetic core member has: a center iron core member accommodated in the inside of said first toroidal coil; a first permanent magnet core member having an N pole face overlapped on one end face of said center iron core member in said first toroidal coil and second toroidal coil, a second permanent magnet core member having an N pole face overlapped on another end face of said center iron core member in said first toroidal coil and said third toroidal coil, a first end iron core member overlapping an S pole face of said first permanent magnet core member in said second toroidal coil, and a second end iron core member overlapping an S pole face of second permanent magnet core member in said third toroidal coil.

19. A vibration generator as set forth in claim 13, wherein the outer circumferential surface of said third toroidal coil is covered by a protective tube.

* * * * *